US011820288B2

(12) United States Patent
Kim et al.

(10) Patent No.: US 11,820,288 B2
(45) Date of Patent: Nov. 21, 2023

(54) APPARATUS AND METHOD FOR MANAGING POWER OF MULTI SOC MODULE IN VEHICLE

(71) Applicant: LG ELECTRONICS INC., Seoul (KR)

(72) Inventors: Jin Kyoung Kim, Seoul (KR); Hyoungkyu Choi, Gyeonggi-do (KR); Hyung Bin Park, Gyeonggi-do (KR); Ilgyeong Hong, Incheon (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 16/786,862

(22) Filed: Feb. 10, 2020

(65) Prior Publication Data
US 2021/0129779 A1    May 6, 2021

(30) Foreign Application Priority Data
Nov. 5, 2019  (KR) .................. 10-2019-0140205

(51) Int. Cl.
*B60R 16/033*  (2006.01)
*G05B 19/042*  (2006.01)
*B60L 58/12*  (2019.01)
*H04L 12/40*  (2006.01)

(52) U.S. Cl.
CPC ............ *B60R 16/033* (2013.01); *B60L 58/12* (2019.02); *G05B 19/042* (2013.01); *G05B 2219/25252* (2013.01); *G05B 2219/2637* (2013.01); *H04L 12/40013* (2013.01); *Y02T 10/72* (2013.01)

(58) Field of Classification Search
CPC ..... B60R 16/033; B60R 16/023; B60L 58/12; G05B 19/042; G05B 2219/25252; G05B 2219/2637; H04L 12/40013; H04L 2012/40215; H04L 2012/40273; H04L 12/12; H04L 12/40039; Y02T 10/72; Y02T 10/70; Y02D 30/50; G01R 31/382
See application file for complete search history.

(56) References Cited

U.S. PATENT DOCUMENTS

| 2017/0088072 | A1* | 3/2017  | Curtis | G08B 31/00 |
| 2019/0319467 | A1* | 10/2019 | Kim    | H02J 7/0029 |
| 2022/0121269 | A1* | 4/2022  | Ota    | G06F 1/28 |

* cited by examiner

*Primary Examiner* — James J Lee
*Assistant Examiner* — Wenyuan Yang
(74) *Attorney, Agent, or Firm* — Fish & Richardson P.C.

(57) ABSTRACT

Disclosed are an apparatus and method for managing power of a multi SoC module in a vehicle. The apparatus for managing power of a multi SoC module in a vehicle includes a multi SoC module configured to include a plurality of SoCs, and a processor configured to change the module mode of the multi SoC module from a normal module mode to a half low power module mode in response to a capacity of a main battery in a vehicle in a driving state being lower than a set first reference value, and maintain a first SoC associated with safety among the plurality of SoCs supplied with power from the main battery in a normal mode while switching a remaining second SoC other than the first SoC to a low power mode.

18 Claims, 16 Drawing Sheets

APPARATUS AND METHOD FOR MANAGING POWER OF MULTI SOC MODULE IN VEHICLE

CROSS-REFERENCE TO RELATED APPLICATION

This present application claims the benefit of priority to Korean Patent Application No. 10-2019-0140205, entitled "APPARATUS AND METHOD FOR MANAGING POWER OF MULTI SoC MODULE IN VEHICLE," filed on Nov. 5, 2019, in the Korean Intellectual Property Office, the entire disclosure of which is incorporated herein by reference.

BACKGROUND

1. Technical Field

The present disclosure relates to an apparatus and method for managing power of a multi system on chip (SoC) module in a vehicle for controlling a module mode of the multi SoC module based on a state of the vehicle and a capacity of a battery in the vehicle.

2. Description of Related Art

A vehicle may implement various functions (for example, a cluster function, a navigation function, and an ADAS function), and may include a plurality of systems on chip (SoC) capable of performing various functions.

As the plurality of SoCs continuously consume power, power consumption is adjusted by controlling each mode of the plurality of SoCs based on a state of a vehicle and a capacity of a battery in the vehicle. Accordingly, it is necessary to manage the battery in the vehicle such that power is not wasted.

Meanwhile, in conventional vehicles, while it is possible to control the modes of the plurality of SoCs based on the capacity of the battery when the vehicle is in a driving state, controlling the modes of the plurality of SoCs is not considered when the vehicle is in a standby state, which may result in power being wasted.

In addition, as the plurality of SoCs in the vehicle are separately disposed at different locations, it is not easy to manage each SoC.

SUMMARY OF THE INVENTION

An aspect of the present disclosure is to manage a battery in a vehicle such that power is not wasted, by adjusting power consumption by controlling each mode of a plurality of SoCs in a multi SoC module based on a state of the vehicle and a capacity of the battery in the vehicle.

Another aspect of the present disclosure is to reduce power consumed even in a standby state, by controlling each mode of a plurality of SoCs in a multi SoC module not only when a vehicle is in a driving state but also when the vehicle enters the standby state.

Still another aspect of the present disclosure is to reduce power consumed by an SoC in a low power mode as much as possible by, in response to at least one SoC among a plurality of SoCs in a multi SoC module being switched from a normal mode to the low power mode according to set conditions, activating a memory selected from a plurality of memories corresponding to the switched SoC and an interrupt DSP in the switched SoC to supply power thereto, and deactivating components in the switched SoC other than the activated memory and the activated interrupt DSP so as to stop supplying power thereto.

Yet another aspect of the present disclosure is to easily manage each SoC, as a plurality of SoCs in a multi SoC module and a plurality of memories corresponding to each of the plurality of SoCs are configured as a plurality of slots (that is, one slot is configured to include one SoC and a plurality of memories, and is detachable).

According to an embodiment of the present disclosure, an apparatus for managing power of a multi SoC module in a vehicle includes a multi SoC module configured to include a plurality of systems on chip (SoC), and a processor configured to change the module mode of the multi SoC module from a normal module mode to a half low power module mode in response to the capacity of a main battery in a vehicle in a driving state being lower than a set first reference value, and maintain a first SoC associated with safety among the plurality of SoCs supplied with power from the main battery in a normal mode while switching a remaining second SoC other than the first SoC to a low power mode.

According to another embodiment of the present disclosure, a method for managing power of a multi SoC module in a vehicle includes changing the module mode of the multi SoC module from a normal module mode to a half low power module mode in response to a capacity of a main battery in a vehicle in a driving state being lower than a set first reference value, and maintaining a first SoC associated with safety among the plurality of SoCs in the multi SoC module supplied with power from the main battery in a normal mode while switching a remaining second SoC other than the first SoC to a low power mode.

Apart from those described above, another method and another system for implementing the present disclosure, and a computer-readable recording medium having a computer program stored therein to perform the method, may be further provided.

Other aspects and features in addition as those described above will become clear from the accompanying drawings, claims, and the detailed description of the present disclosure.

According to the present disclosure, it is possible to manage a battery in a vehicle such that power is not wasted, by adjusting power consumption by controlling each mode of a plurality of SoCs in a multi SoC module based on the state of the vehicle and the capacity of the battery in the vehicle.

According to the present disclosure, it is possible to reduce the power consumed even in a standby state, by controlling each mode of a plurality of SoCs in a multi SoC module not only when the vehicle is in a driving state but also when the vehicle enters the standby state.

According to the present disclosure, it is possible to reduce the power consumed by an SoC in a low power mode as much as possible by, in response to at least one SoC among a plurality of SoCs in a multi SoC module being switched from a normal mode to the low power mode according to set conditions, activating a memory selected from a plurality of memories corresponding to the switched SoC and an interrupt DSP in the switched SoC to supply power thereto, and deactivating components in the switched SoC other than the activated memory and the activated interrupt DSP so as to stop supplying power thereto.

According to the present disclosure, it is possible to easily manage each SoC, as a plurality of SoCs in a multi SoC module and a plurality of memories corresponding to each of the plurality of SoCs are configured as a plurality of slots (that is, one slot is configured to include one SoC a the plurality of memories, and is detachable).

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
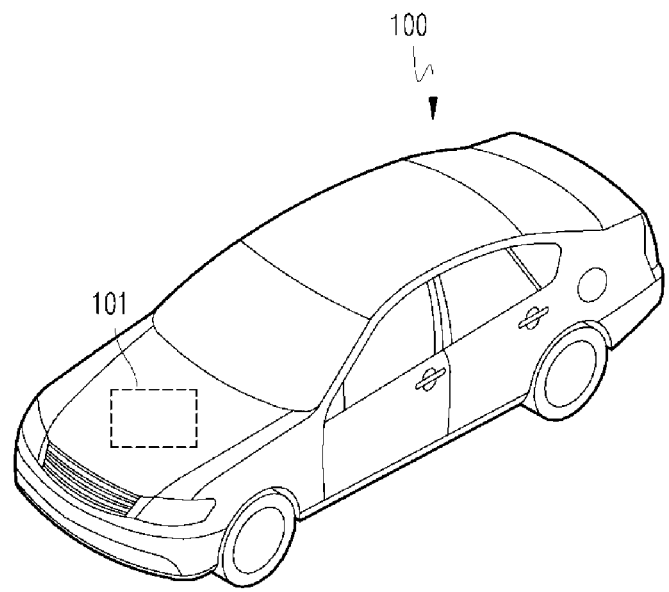
FIG. 1 is a diagram showing a vehicle to which an apparatus for managing power of a multi system on chip (SoC) module in a vehicle according to an embodiment of the present disclosure is applied.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. Further, in the description of the embodiments of the present disclosure, when it is determined that the detailed description of the related art would obscure the gist of the present disclosure, the description thereof will be omitted. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms "a," "an," and "the" may be intended to include the plural forms as well, unless the context clearly indicates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

The vehicle described in the present disclosure may include, but is not limited to, a vehicle having an internal combustion engine as a power source, a hybrid vehicle having an engine and an electric motor as a power source, and an electric vehicle having an electric motor as a power source.

FIG. 1 is a diagram showing a vehicle to which an apparatus for managing power of a multi system on chip (SoC) module in a vehicle according to an embodiment of the present disclosure is applied.

Referring to FIG. 1, an apparatus 101 for managing power of a multi SoC module in a vehicle according to the present disclosure may be provided, for example, at the front or the rear (for example, the trunk) of a vehicle 100.

The apparatus 101 for managing power of a multi SoC module in a vehicle according to the present disclosure may include a multi SoC module that includes a plurality of systems on chip (SoCs), and may control a module mode of the multi SoC module based on a state of a vehicle and a capacity of a battery in the vehicle to reduce power consumption in the plurality of SoCs in the multi SoC module.

Figure 2:
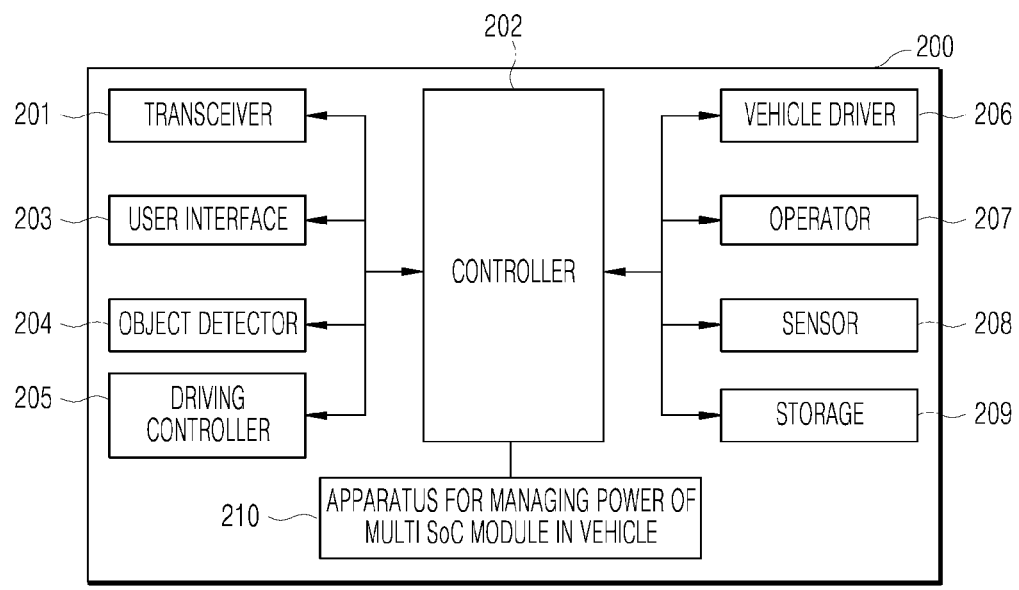
FIG. 2 is a block diagram showing a system to which the apparatus for managing power of a multi SoC module in a vehicle according to an embodiment of the present disclosure is applied.

FIG. 2 is a block diagram showing a system to which the apparatus for managing power of a multi SoC module in a vehicle according to an embodiment of the present disclosure is applied.

Referring to FIG. 2, a system 200 to which the apparatus for managing power of a multi SoC module in a vehicle is applied may be included in the vehicle 100, and may include a transceiver 201, a controller 202, a user interface 203, an object detector 204, a driving controller 205, a vehicle driver 206, an operator 207, a sensor 208, a storage 209, and an apparatus 210 for managing power of a multi SoC module in a vehicle.

Depending on the embodiment, the system to which the apparatus for managing power of a multi SoC module in a vehicle is applied may include other components in addition to the components shown in FIG. 2 and described below, or may not include some of the components shown in FIG. 2 and described below.

The vehicle 100 may be switched from an autonomous mode to a manual mode, or switched from the manual mode to the autonomous mode depending on the driving situation. Here, the driving situation may be judged by at least one of the information received by the transceiver 201, the external object information detected by the object detection unit 204, or the navigation information acquired by the navigation module.

The vehicle 100 may be switched from the autonomous mode to the manual mode, or from the manual mode to the autonomous mode, according to a user input received through the user interface 203.

When the vehicle 100 is operated in the autonomous driving mode, the vehicle 100 may be operated under the control of the operator 207 that controls driving, parking, and unparking. When the vehicle 100 is operated in the manual mode, the vehicle 100 may be operated by an input of the driver's mechanical driving operation.

The transceiver 201 is a module for performing communication with an external device. Here, the external device may be a user terminal, another vehicle, or a server.

The transceiver 201 may include at least one of a transmission antenna, a reception antenna, a radio frequency (RF) circuit capable of implementing various communication protocols, or an RF element in order to perform communication.

The transceiver 201 may perform short range communication, GPS signal reception, V2X communication, optical communication, broadcast transmission/reception, and intelligent transport systems (ITS) communication functions.

The transceiver 201 may further support other functions than the functions described, or may not support some of the functions described, depending on the embodiment.

The transceiver 201 may support short-range communication by using at least one of Bluetooth, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB) technologies.

The transceiver 201 may form short-range wireless communication networks so as to perform short-range communication between the vehicle 100 and at least one external device.

The transceiver 201 may include a Global Positioning System (GPS) module or a Differential Global Positioning System (DGPS) module for acquiring position information of the vehicle 100.

The transceiver 201 may include a module for supporting wireless communication between the vehicle 100 and a server (V2I: vehicle to infrastructure), between the vehicle 100 and another vehicle (V2V: vehicle to vehicle), or between the vehicle 100 and a pedestrian (V2P: vehicle to pedestrian). That is, the transceiver 201 may include a V2X communication module. The V2X communication module may include an RF circuit capable of implementing V2I, V2V, and V2P communication protocols.

The transceiver 201 may receive a danger information broadcast signal transmitted by another vehicle through the V2X communication module, and may transmit a danger information inquiry signal and receive a danger information response signal in response thereto.

The transceiver 201 may include an optical communication module for communicating with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the vehicle 100.

The transceiver 201 may include a broadcast communication module for receiving a broadcast signal from an external broadcast management server through a broadcast channel, or transmitting a broadcast signal to the broadcast management server. The broadcast channel may include a satellite channel and a terrestrial channel. Examples of the broadcast signal may include a TV broadcast signal, a radio broadcast signal, and a data broadcast signal.

The transceiver 201 may include an ITS communication module for exchanging information, data, or signals with a traffic system. The ITS communication module may provide acquired information and data to the traffic system. The ITS communication module may receive information, data or signals from the traffic system. For example, the ITS communication module may receive road traffic information from the traffic system, and provide the information to the controller 202. For example, the ITS communication module may receive a control signal from the traffic system, and provide the control signal to the controller 202 or a processor provided in the vehicle 100.

Depending on the embodiment, the overall operation of each module of the transceiver 201 may be controlled by a separate processor provided in the transceiver 201. The transceiver 201 may include a plurality of processors, or may not include a processor. When the transceiver 201 does not include a processor, the transceiver 201 may be operated under the control of the processor of another device in the vehicle 100 or the controller 202.

The transceiver 201 may implement a vehicle display device together with the user interface 203. In this case, the vehicle display device may be referred to as a telematics device or an audio video navigation (AVN) device.

Figure 3:
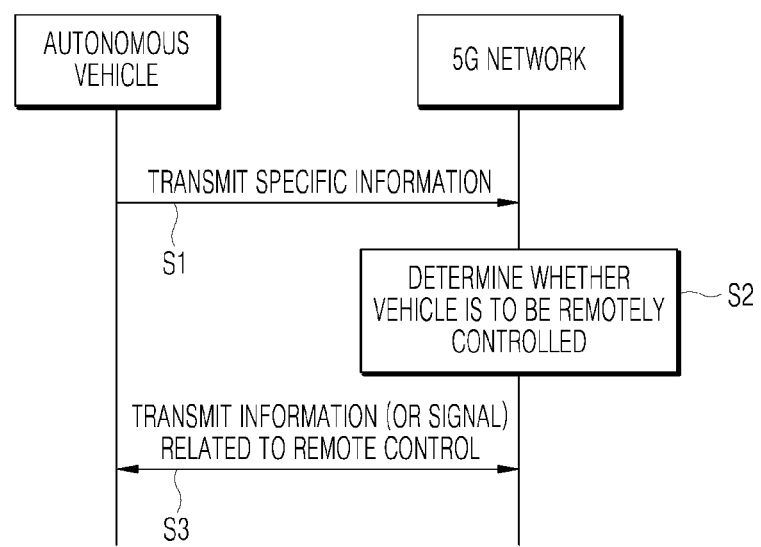
FIG. 3 is a diagram showing an example of the basic operation of an autonomous vehicle and a 5G network in a 5G communication system.

FIG. 3 is a diagram showing an example of the basic operation of an autonomous vehicle and a 5G network in a 5G communication system.

The transceiver 201 may transmit specific information to the 5G network when the vehicle 100 is operated in the autonomous mode (S1).

In this case, the specific information may include autonomous driving-related information.

The autonomous driving-related information may be information directly related to driving control of the vehicle. For example, the autonomous driving-related information may include one or more of object data indicating an object around the vehicle, map data, vehicle state data, vehicle location data, and driving plan data.

The autonomous driving-related information may further include service information required for autonomous driving. For example, the specific information may include information about the destination and the safety level of the vehicle, which are inputted through the user interface 203.

In addition, the 5G network can determine whether the vehicle is remotely controlled (S2).

Here, the 5G network may include a server or a module which performs remote control related to autonomous driving.

The 5G network may transmit information (or a signal) related to the remote control to an autonomous vehicle (S3).

As described above, the information related to the remote control may be a signal applied directly to the self-driving vehicle, and may further include service information necessary for autonomous driving. In one embodiment of the present disclosure, the autonomous vehicle can provide autonomous driving related services by receiving service information such as insurance and danger sector information selected on a route through a server connected to the 5G network.

An essential process for performing 5G communication between the autonomous vehicle 100 and the 5G network (for example, an initial access process between the vehicle 100 and the 5G network) will be briefly described with reference to FIG. 4 to FIG. 8 below.

First, an example of the application operation through the 5G network and the autonomous vehicle 100 performed in the 5G communication system is as follows.

Figure 4:
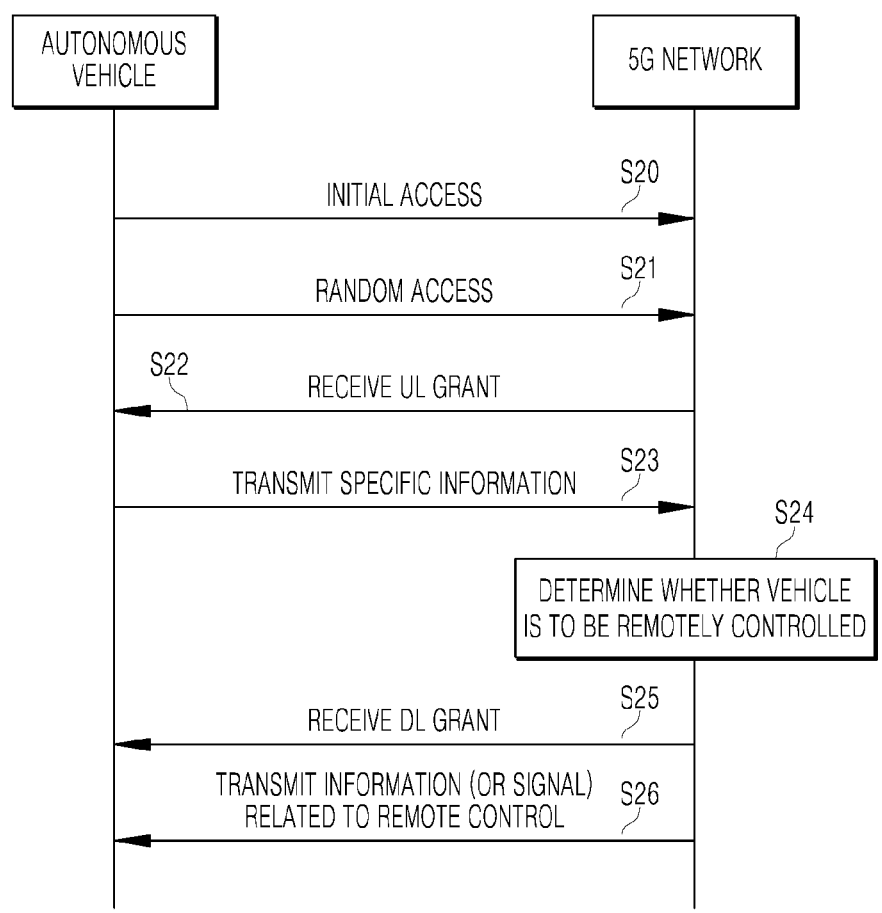
FIG. 4 is a diagram showing an example of an applied operation of an autonomous vehicle and a 5G network in a 5G communication system.

As shown in FIG. 4, the vehicle 100 performs an initial access procedure with a 5G network (initial access step (S20)). In this case, the initial access procedure includes a cell search process for acquiring downlink (DL) synchronization and a process for acquiring system information.

The vehicle 100 may perform a random access process with the 5G network (random access step, S21). At this time, the random access procedure includes an uplink (UL) synchronization acquisition process or a preamble transmission process for UL data transmission, a random access response reception process, and the like.

The 5G network may transmit an Uplink (UL) grant for scheduling transmission of specific information to the autonomous vehicle 100 (UL grant receiving step, S22).

The procedure by which the vehicle 100 receives the UL grant includes a scheduling process in which a time/frequency resource is allocated for transmission of UL data to the 5G network.

The autonomous vehicle 100 may transmit specific information over the 5G network based on the UL grant (specific information transmission step, S23).

The 5G network may determine whether the vehicle 100 is to be remotely controlled based on the specific information transmitted from the vehicle 100 (vehicle remote control determination step, S24).

The autonomous vehicle 100 may receive the DL grant through a physical DL control channel for receiving a response on pre-transmitted specific information from the 5G network (DL grant receiving step, S25).

The 5G network may transmit information (or a signal) related to the remote control to the autonomous vehicle 100 based on the DL grant (remote control related information transmission step, S26).

Although a combined procedure of an initial access process and/or arbitrary receiving process of the autonomous vehicle 100 and the 5G network, and a DL grant receiving process was illustrated, the present disclosure is not limited to this example.

For example, an initial access procedure and/or a random access procedure may be performed through an initial access step, an UL grant reception step, a specific information transmission step, a remote control decision step of the vehicle, and an information transmission step associated with remote control. Further, an initial access procedure and/or a random access procedure may be performed through a random access step, an UL grant reception step, a specific information transmission step, a remote control decision step of the vehicle, and an information transmission step associated with remote control. In addition, the autonomous vehicle 100 may be controlled in a manner that combines an AI operation with a DL grant receiving process through a step of transmitting specific information, a step of determining whether to remotely control the vehicle, a step of receiving a DL grant, and a step of transmitting information related to remote control.

In addition, the operation of the above-described autonomous vehicle 100 is merely exemplary, and the present disclosure is not limited thereto.

For example, the operation of the autonomous vehicle 100 may be performed by selectively combining an initial access step, an arbitrary access step, an UL grant receiving step, or a DL grant receiving step, with a step of transmitting specific information and a step of transmitting information related to remote control. In addition, the operation of the autonomous vehicle 100 may be composed of a random access step, an UL grant reception step, a specific information transmission step, and an information transmission step associated with the remote control. The operation of the autonomous vehicle 100 may consist of an initial access step, a random access step, a specific information transmission step, and an information transmission step associated with the remote control. In addition, the operation of the autonomous vehicle 100 may be composed of an UL grant reception step, a specific information transmission step, a DL grant reception step, and an information transmission step associated with the remote control.

Figure 5:
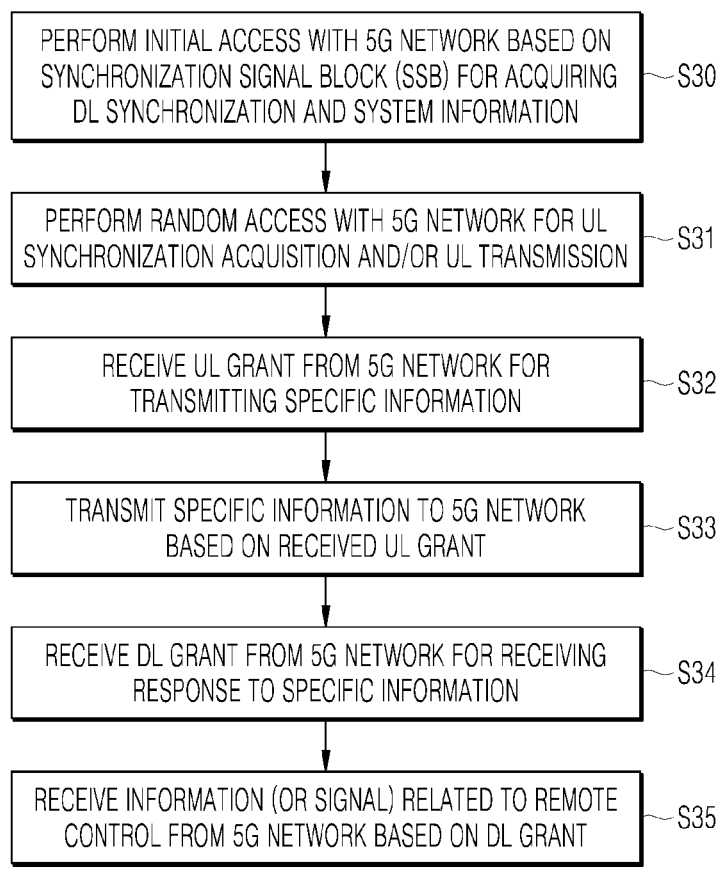
FIGS. 5 to 8 are diagrams showing an example of the operation of an autonomous vehicle using a 5G communication.

As illustrated in FIG. 5, the vehicle 100 including an autonomous driving module may perform an initial access process with the 5G network based on Synchronization Signal Block (SSB) for acquiring DL synchronization and system information (initial access step, S30).

The autonomous vehicle 100 may perform a random access process with the 5G network for UL synchronization acquisition and/or UL transmission (random access step, S31).

The autonomous vehicle 100 may receive the UL grant from the 5G network for transmitting specific information (UL grant receiving step, S32).

The autonomous vehicle 100 may transmit the specific information to the 5G network based on the UL grant (specific information transmission step, S33).

The autonomous vehicle 100 may receive the DL grant from the 5G network for receiving a response to the specific information (DL grant receiving step, S34).

The autonomous vehicle 100 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. Further, a QCL relationship may be added to the DL grant reception step with respect to the beam receiving direction of the PDCCH including the DL grant.

Figure 6:
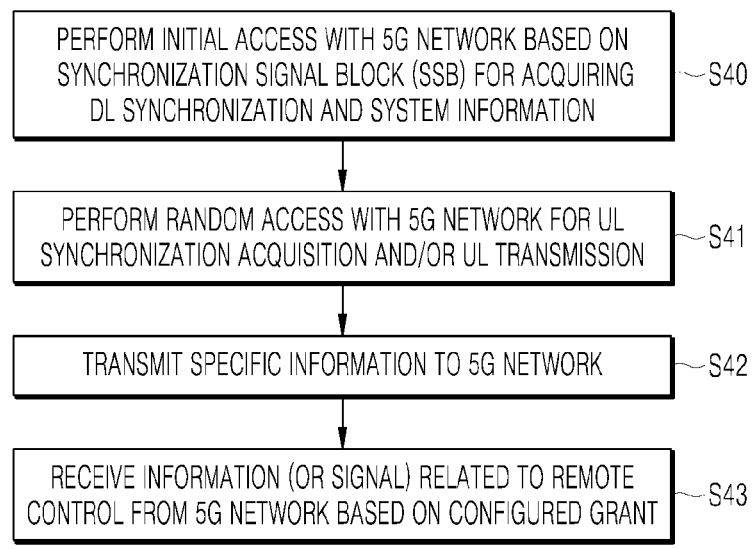

As illustrated in FIG. 6, the autonomous vehicle 100 may perform an initial access process with the 5G network based on SSB for acquiring DL synchronization and system information (initial access step, S40).

The autonomous vehicle 100 may perform a random access process with the 5G network for UL synchronization acquisition and/or UL transmission (random access step, S41).

The autonomous vehicle 100 may transmit specific information based on a configured grant to the 5G network (UL grant receiving step, S42). In other words, instead of receiving the UL grant from the 5G network, the configured grant may be received.

The autonomous vehicle 100 may receive the remote control related information (or a signal) from the 5G network based on the configured grant (remote control related information receiving step, S43).

Figure 7:
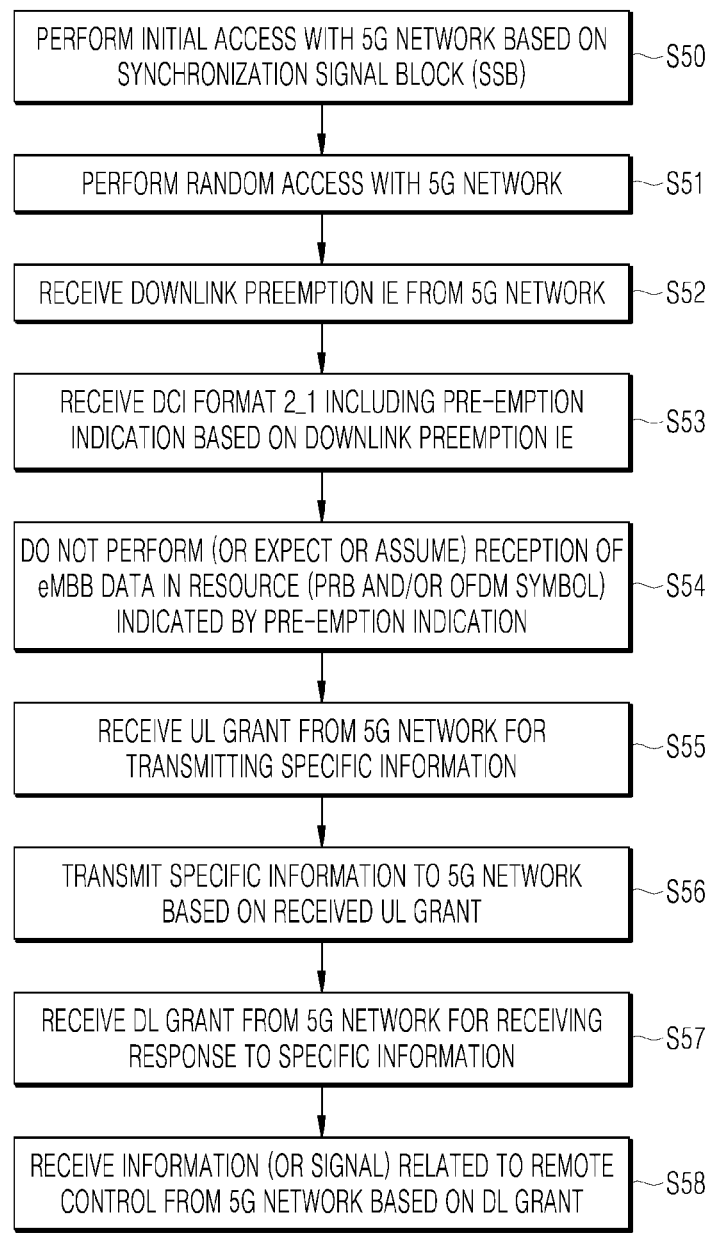

As illustrated in FIG. 7, the autonomous vehicle 100 may perform an initial access process with the 5G network based on SSB for acquiring DL synchronization and system information (initial access step, S50).

The autonomous vehicle 100 may perform a random access process with the 5G network for UL synchronization acquisition and/or UL transmission (random access step, S51).

In addition, the autonomous vehicle 100 may receive Downlink Preemption (DL) and Information Element (IE) from the 5G network (DL Preemption IE reception step, S52).

The autonomous vehicle 100 may receive DCI (Downlink Control Information) format 2_1 including preemption indication based on the DL preemption IE from the 5G network (DCI format 2_1 receiving step, S53).

The autonomous vehicle 100 may not perform (or expect or assume) the reception of eMBB data in the resource (PRB and/or OFDM symbol) indicated by the pre-emption indication (step of not receiving eMBB data, S54).

The autonomous vehicle 100 may receive the UL grant over the 5G network for transmitting specific information (UL grant receiving step, S55).

The autonomous vehicle 100 may transmit the specific information to the 5G network based on the UL grant (specific information transmission step, S56).

The autonomous vehicle 100 may receive the DL grant from the 5G network for receiving a response to the specific information (DL grant receiving step, S57).

The autonomous vehicle 100 may receive the remote control related information (or signal) from the 5G network based on the DL grant (remote control related information receiving step, S58).

Figure 8:
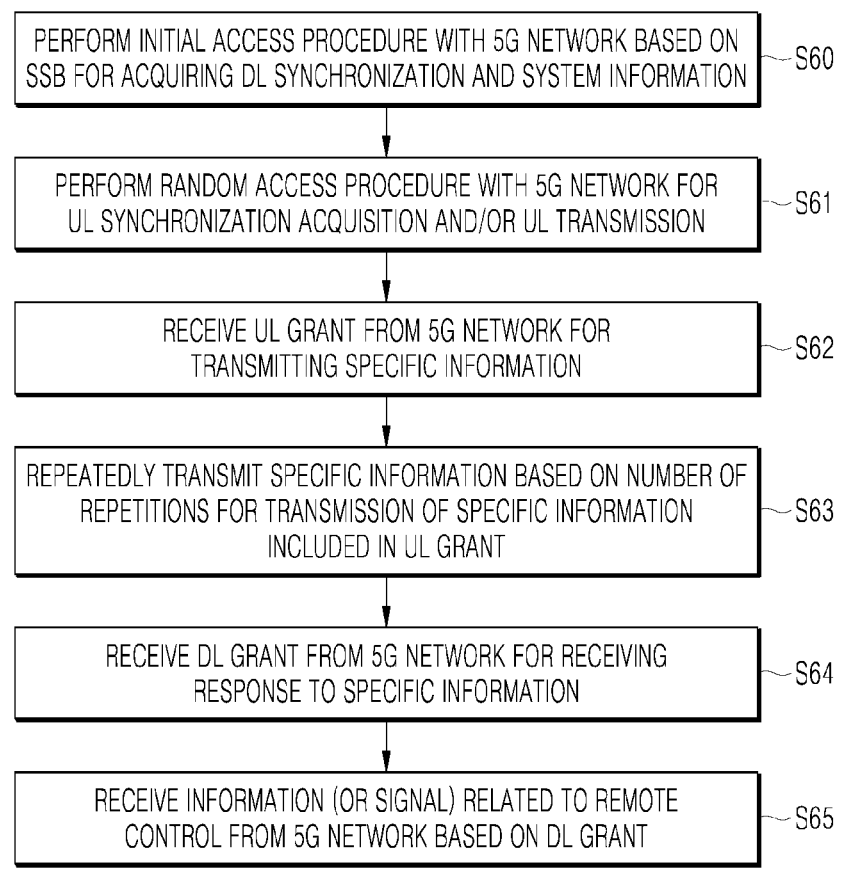

As illustrated in FIG. 8, the autonomous vehicle 100 may perform an initial access process with the 5G network based on SSB for acquiring DL synchronization and system information (initial access step, S60).

The autonomous vehicle 100 may perform a random access process with the 5G network for UL synchronization acquisition and/or UL transmission (random access step, S61).

The autonomous vehicle 100 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

In addition, the autonomous vehicle 100 transmits specific information to the 5G network based on the UL grant.

Also, the repetitive transmission of specific information may be performed through frequency hopping, the first specific information may be transmitted in the first frequency resource, and the second specific information may be transmitted in the second frequency resource.

The specific information may be transmitted through Narrowband of 6 Resource Block (6RB) and 1 Resource Block (1RB).

The autonomous vehicle 100 may receive the DL grant from the 5G network for receiving a response to the specific information (DL grant receiving step, S64).

The autonomous vehicle 100 may receive the remote control related information (or signal) from the 5G network based on the DL grant (remote control related information receiving step, S65).

The above-described 5G communication technique can be applied in combination with the embodiment proposed in this specification, which will be described in FIG. 1 to FIG. 18, or supplemented to specify or clarify the technical feature of the embodiment proposed in this specification.

The vehicle 100 is connected to an external server through a communication network, and is capable of moving along a predetermined route without driver intervention using the autonomous driving technology.

In the following embodiments, the user may be interpreted as a driver, a passenger, or the owner of a user terminal.

When the vehicle 100 is traveling in the autonomous mode, the type and frequency of accidents may vary greatly depending on the ability to sense the surrounding risk factors in real time. The route to the destination may include sectors having different levels of risk due to various causes such as weather, terrain characteristics, traffic congestion, and the like.

At least one of the autonomous vehicle, the user terminal, or the server of the present disclosure may be linked to or integrated with an artificial intelligence module, a drone (an unmanned aerial vehicle, UAV), a robot, an augmented reality (AR), a virtual reality (VR), and a device related to 5G services.

For example, the vehicle 100 may operate in association with at least one AI module or robot included in the vehicle 100, during autonomous driving.

For example, the vehicle 100 may interact with at least one robot. The robot may be an autonomous mobile robot (AMR). The mobile robot is capable of moving by itself, may freely move, and may be equipped with a plurality of sensors so as to be capable of avoiding obstacles during traveling. The mobile robot may be a flying robot (for example, a drone) having a flight device. The mobile robot may be a wheeled robot having at least one wheel and moving by means of the rotation of the wheel. The mobile robot may be a legged robot having at least one leg and being moved using the leg.

The robot may function as a device that complements the convenience of a vehicle user. For example, the robot may perform a function of moving a load placed on the vehicle 100 to the final destination of the user. For example, the robot may perform a function of guiding the user, who has alighted from the vehicle 100, to the final destination. For example, the robot may perform a function of transporting the user, who has alighted from the vehicle 100, to the final destination.

At least one electronic device included in the vehicle 100 may communicate with the robot through a communication device.

At least one electronic device included in the vehicle 100 may provide the robot with data processed by at least one electronic device included in the vehicle. For example, at least one electronic device included in the vehicle 100 may provide the robot with at least one of object data indicating an object around the vehicle, HD map data, vehicle state data, vehicle position data, or driving plan data.

At least one electronic device included in the vehicle 100 can receive data processed by the robot from the robot. At least one electronic device included in the vehicle 100 can receive at least one of sensing data, object data, robot state data, robot position data, and movement plan data of the robot, which are generated by the robot.

At least one electronic device included in the vehicle 100 may generate a control signal based on data received from the robot. For example, at least one electronic device included in the vehicle may compare the information about the object generated by the object detection device with the information about the object generated by the robot, and generate a control signal based on the comparison result. At least one electronic device included in the vehicle 100 may generate a control signal so as to prevent interference between the route of the vehicle and the route of the robot.

At least one electronic apparatus included in the vehicle 100 may include a software module or a hardware module for implementing an artificial intelligence (AI) (hereinafter referred to as an artificial intelligence module). At least one electronic device included in the vehicle may input the acquired data to the AI module, and use the data which is outputted from the AI module.

The artificial intelligence module may perform machine learning on input data using at least one artificial neural network (ANN). The artificial intelligence module may output driving plan data through machine learning on the input data.

At least one electronic device included in the vehicle 100 can generate a control signal based on data which is output from the AI module.

At least one electronic device included in the vehicle 100 may receive data processed by artificial intelligence, from an external device, via a communication device, depending on the embodiment. At least one electronic device included in the vehicle 1000 may generate a control signal based on data processed by artificial intelligence.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of artificial intelligence into various fields of information technology to solve problems in the respective fields.

The controller 202 may be implemented by using at least one of an application specific integrated circuit (ASIC), a digital signal processor (DSP), a digital signal processing device (DSPD), a programmable logic device (PLD), a field programmable gate array (FPGA), a processor, a controller, a micro-controller, a microprocessor, or other electronic units for performing other functions.

The user interface 203 is used for communication between the vehicle 100 and the vehicle user. The user interface 1300 may receive an input signal of the user, transmit the received input signal to the controller 202, and provide information held by the vehicle 100 to the user by the control of the controller 202. The user interface 203 may include, but is not limited to, an input module, an internal camera, a bio-sensing module, and an output module.

The input module is for receiving information from a user. The data collected by the input module may be analyzed by the controller 202 and processed by the user's control command.

The input module may receive the destination of the vehicle 100 from the user and provide the destination to the controller 202.

The input interface may input to the controller 1200 a signal for designating and deactivating at least one of the plurality of sensor modules of the object detector 204 according to the user's input.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or an image.

The output module may include at least one of a display module, an acoustic output module, and a haptic output module.

The display module may display graphic objects corresponding to various information.

The display module may include at least one of a liquid crystal display (LCD), a thin film transistor liquid crystal display (TFT LCD), an organic light emitting diode (OLED), a flexible display, a 3D display, or an e-ink display.

The display module may have a mutual layer structure with a touch input module, or may be integrally formed to implement a touch screen.

The display module may be implemented as a Head Up Display (HUD). When the display module is implemented as an HUD, the display module may include a projection module to output information through an image projected onto a windshield or a window.

The display module may include a transparent display. The transparent display may be attached to the windshield or the window.

The transparent display may display a predetermined screen with a predetermined transparency. The transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The user interface 203 may include a plurality of display modules.

The display module may be disposed on one area of a steering wheel, one area of an instrument panel, one area of a seat, one area of each pillar, one area of a door, one area of a center console, one area of a head lining, or one area of a sun visor, or may be implemented on one area of a windshield or one area of a window.

The sound output module may convert an electric signal provided from the controller 202 into an audio signal, and output the audio signal. To this end, the sound output module may include one or more speakers.

The haptic output module may generate a tactile output. For example, the haptic output module may operate to allow the user to perceive the output by vibrating a steering wheel, a seat belt, and a seat.

The object detector 204 is for detecting an object located outside the vehicle 100. The object detector 2400 may generate object information based on the sensing data, and transmit the generated object information to the controller 202. Examples of the object may include various objects related to the driving of the vehicle 100, such as a lane, another vehicle, a pedestrian, a motorcycle, a traffic signal, light, a road, a structure, a speed bump, a landmark, and an animal.

The object detector 204 may include a camera module as a plurality of image capturers, light imaging detection and ranging (lidar), an ultrasonic sensor, radio detection and ranging (radar) 1450, and an infrared sensor, which are a plurality of sensor modules.

The object detector 204 may sense environmental information around the vehicle 100 through a plurality of sensor modules.

Depending on the embodiment, the object detector 204 may further include components other than the components described, or may not include some of the components described.

The radar may include an electromagnetic wave transmitting module and an electromagnetic wave receiving module. The radar may be implemented by a pulse radar system or a continuous wave radar system in terms of the radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) scheme or a phase-shift scheme by using an electromagnetic wave as a medium, and may detect the position of the detected object, the distance to the detected object, and a relative speed of the detected object.

The radar may be disposed at an appropriate location outside the vehicle for sensing an object disposed at the front, back, or side of the vehicle.

The lidar may include a laser transmitting module and a laser receiving module. The lidar may be implemented in a TOF scheme or a phase-shift scheme.

The lidar may be implemented as a driven type or a non-driven type.

When the lidar is embodied in the driving method, the lidar may rotate by means of a motor, and detect an object near the vehicle 100. When the lidar is implemented in the non-driving method, the lidar may detect an object within a predetermined range with respect to the vehicle 100 by means of light steering. The vehicle 100 may include a plurality of non-driven type lidars.

The lidar may detect an object based on a TOF scheme or a phase-shift scheme by using a laser beam as a medium, and may detect the position of the detected object, the distance to the detected object, and the relative speed of the detected object.

The lidar may be disposed at an appropriate location outside the vehicle for sensing an object disposed at the front, back, or side of the vehicle.

The image capturer may be disposed at a suitable place outside the vehicle, for example, the front, back, right side mirrors and the left side mirror of the vehicle, in order to acquire a vehicle exterior image. The image capturer may be a mono camera, but is not limited thereto, and may be a stereo camera, an around view monitoring (AVM) camera, or a 360 degree camera.

The image capturer may be disposed close to the front windshield in the interior of the vehicle in order to acquire an image of the front of the vehicle. The image capturer may be disposed around the front bumper or the radiator grill.

The image capturer may be disposed close to the rear glass in the interior of the vehicle in order to acquire an image of the back of the vehicle. The image capturer may be disposed around the rear bumper, the trunk, or the tail gate.

The image capturer may be disposed close to at least one side window in the vehicle in order to obtain an image of the side of the vehicle. In addition, the image capturer may be disposed around the fender or the door.

The image capturer may provide the obtained image to the controller 202.

The ultrasonic sensor may include an ultrasonic transmission module and an ultrasonic reception module. The ultrasonic sensor can detect an object based on ultrasonic waves, and can detect the position of the detected object, the distance to the detected object, and the relative speed of the detected object.

The ultrasonic sensor may be disposed at an appropriate position outside the vehicle for sensing an object at the front, back, or side of the vehicle.

The infrared sensor may include an infrared transmission module and an infrared reception module. The infrared sensor can detect an object based on the infrared light, and can detect the position of the detected object, the distance to the detected object, and the relative speed of the detected object.

The infrared sensor may be disposed at an appropriate location outside the vehicle in order to sense objects located at the front, rear, or side portions of the vehicle.

The controller 202 may control the overall operation of the object detector 204.

The controller 202 may compare data sensed by the radar, the lidar, the ultrasonic sensor, and the infrared sensor with pre-stored data so as to detect or classify an object.

The controller 202 may detect and track objects based on the acquired image. The controller 202 may perform operations such as calculating a distance to an object and calculating a relative speed with respect to the object through an image processing algorithm.

For example, the controller 202 may acquire information on the distance to the object and information on the relative speed with respect to the object on the basis of variation of the object size with time in the acquired image.

For example, the controller 202 may obtain information on the distance to the object and information on the relative speed through, for example, a pin hole model and road surface profiling.

The controller 202 may detect and track the object based on the reflected electromagnetic wave that is reflected by the object and returned to the object after being transmitted. The controller 202 may perform operations such as calculating a distance to an object and calculating a relative speed of the object based on the electromagnetic wave.

The controller 202 may detect and track the object based on the reflected laser beam that is reflected by the object and returned to the object after being transmitted. The controller 202 may perform operations such as calculating a distance to an object and calculating a relative speed of the object based on the laser beam.

The controller 202 may detect and track the object based on the reflected ultrasonic wave that is reflected by the object and returned to the object after being transmitted. The controller 202 may perform operations such as calculating a distance to an object and calculating a relative speed of the object based on the ultrasonic wave.

The controller 202 may detect and track the object based on the reflected infrared light that is reflected by the object and returned to the object after being transmitted. The controller 202 may perform operations such as calculating a distance to an object and calculating a relative speed of the object based on the infrared light.

Depending on the embodiment, the object detector 204 may include a separate processor from the controller 202. In addition, each of the radar, the lidar, the ultrasonic sensor and the infrared sensor may include a processor.

When a processor is included in the object detector 204, the object detector 204 may be operated under the control of the processor controlled by the controller 202.

The driving controller 205 may receive a user input for driving. In the case of the manual mode, the vehicle 100 may operate based on the signal provided by the driving controller 205.

The vehicle driver 206 may electrically control the driving of various apparatuses in the vehicle 100. The vehicle driver 206 may electrically control driving of a power train, a chassis, a door/window, a safety device, a lamp, and an air conditioner in the vehicle 100.

The operator 207 may control various operations of the vehicle 100. The operator 207 may be operated in an autonomous mode.

The operator 207 may include a driving module, an unparking module, and a parking module.

Depending on the embodiment, the operator 207 may further include constituent elements other than the constituent elements to be described, or may not include some of the constitute elements.

The operator 207 may include a processor under the control of the controller 202. Each module of the operator 207 may include a processor individually.

Depending on the embodiment, when the operator 207 is implemented as software, it may be a sub-concept of the controller 202.

The driving module may perform driving of the vehicle 100.

The driving module may receive object information from the object detector 204, and provide a control signal to a vehicle driving module to perform the driving of the vehicle 100.

The driving module may receive a signal from an external device via the transceiver 201, and provide a control signal to the vehicle driving module to perform the driving of the vehicle 100.

The unparking module may perform unparking of the vehicle 100.

The unparking module may receive navigation information from the navigation module, and provide a control signal to the vehicle driving module to perform the departure of the vehicle 100.

In the unparking module, object information may be received from the object detector 204, and a control signal may be provided to the vehicle driving module, so that the unparking of the vehicle 100 may be performed.

The unparking module may receive a signal from an external device via the transceiver 201, and provide a control signal to the vehicle driving module to perform the unparking of the vehicle 100.

The parking module may perform parking of the vehicle 100.

The parking module may receive navigation information from the navigation module, and provide a control signal to the vehicle driving module to perform the parking of the vehicle 100.

In the parking module, object information may be provided from the object detector 204, and a control signal may be provided to the vehicle driving module, so that the parking of the vehicle 100 may be performed.

The parking module may receive a signal from an external device via the transceiver 201, and provide a control signal to the vehicle driving module so as to perform the parking of the vehicle 100.

The navigation module may provide the navigation information to the controller 202. The navigation information may include at least one of map information, set destination information, route information according to destination setting, information about various objects on the route, lane information, or current location information of the vehicle.

The navigation module may provide the controller 202 with a parking lot map of the parking lot entered by the vehicle 100. When the vehicle 100 enters the parking lot, the controller 202 receives the parking lot map from the navigation module, and projects the calculated route and fixed identification information on the provided parking lot map so as to generate the map data.

The navigation module may include a memory. The memory may store navigation information. The navigation information may be updated by the information received through the transceiver 201. The navigation module may be controlled by a built-in processor, or may be operated by receiving an external signal, for example, a control signal from the controller 202, but the present disclosure is not limited to this example.

The driving module of the operator 207 may be provided with the navigation information from the navigation module, and may provide a control signal to the vehicle driving module so that driving of the vehicle 100 may be performed.

The sensor 208 may sense the state of the vehicle 100 using a sensor mounted on the vehicle 100, that is, a signal related to the state of the vehicle 100, and obtain movement route information of the vehicle 100 according to the sensed signal. The sensor 208 may provide the obtained movement route information to the controller 202.

The sensor 208 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 208 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 208 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS).

The sensor 208 may generate vehicle state information based on sensing data. The vehicle status information may be information generated based on data sensed by various sensors provided in the vehicle.

Vehicle state information may include information such as attitude information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, interior temperature information of the vehicle, interior humidity information of the vehicle, pedal position information, and vehicle engine temperature information.

The storage 209 is electrically connected to the controller 202. The storage 209 may store basic data for each unit of the apparatus 210 for managing power of a multi SoC module in a vehicle, control data for operation control of each unit in the apparatus 210 for managing power of a multi SoC module in a vehicle, and input and output data. The storage 209 may be various storage devices such as a ROM, a RAM, an EPROM, a flash drive, and a hard drive, in terms of hardware. The storage 209 may store various data for overall operation of the vehicle 100, such as a program for processing or controlling the vehicle controller 202, in particular driver propensity information. Here, the storage 209 may be formed integrally with the controller 202 or may be implemented as a sub-component of the controller 202.

The apparatus 210 for managing power of a multi SoC module in a vehicle can manage the battery in the vehicle such that power is not wasted, by adjusting power consumption by controlling each mode of the plurality of SoCs in the multi SoC module based on the state of the vehicle 100 and the capacity of the battery in the vehicle 100.

The apparatus 210 for managing power of a multi SoC module in a vehicle may include a multi SoC module, a memory module, and a processor, and will be described in detail below with reference to FIG. 9. Here, the memory module may be included in the storage 209, and the processor may be included in the controller 202.

Figure 9:
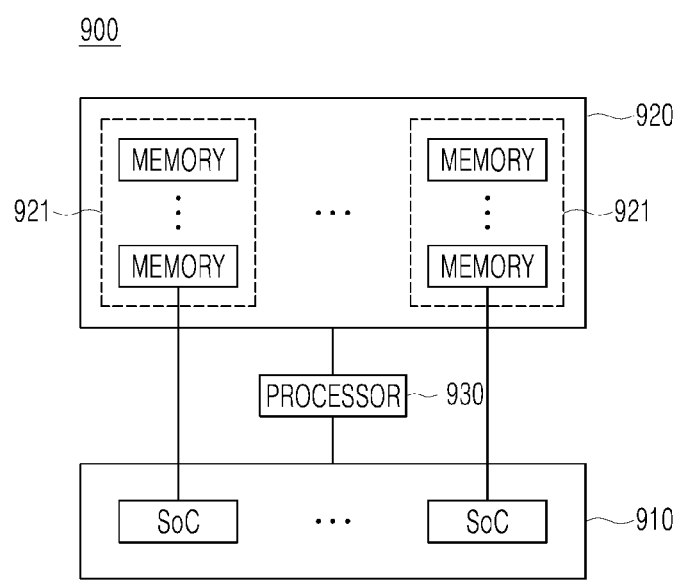
FIG. 9 is a diagram showing an example of a configuration of the apparatus for managing power of a multi SoC module in a vehicle according to an embodiment of the present disclosure.

FIG. 9 is a diagram showing an example of a configuration of the apparatus for managing power of a multi SoC module in a vehicle according to an embodiment of the present disclosure.

Referring to FIG. 9, an apparatus 900 for managing power of a multi SoC module in a vehicle according to an embodiment of the present disclosure may include a multi SoC module 910, a memory module 920, and a processor 930.

The multi SoC module 910 may include a plurality of systems on chip (SoCs).

The memory module 920 may include a plurality of memories 921 (for example, 4 GB and 8 GB memories) corresponding to each of the plurality of SoCs. In the case of 4 GB, for example, the plurality of memories 921 may include four 1 GB memories.

The processor 930 may check (or change) the state of the vehicle based on signals (for example, ACC ON and ACC OFF signals) inputted to a vehicle, and may check a capacity of a battery in the vehicle at each set period. Here, the battery in the vehicle may include a main battery and a backup battery.

The processor 930 may change (or set) a module mode of the multi SoC module 910 based on the state of the vehicle and the capacity of the battery in the vehicle, and control the multi SoC module 910 according to the module mode.

Here, the module mode of the multi SoC module 910 may be any one of a power on module mode, a normal module mode, a half low power module mode, a low power module mode, and a power off module mode. In addition, each SoC in the multi SoC module 910 may be any one of a power on mode, a normal mode, a low power mode, and a power off mode.

In the power on module mode, all the SoCs in the multi SoC module 910 are in the power on mode, in the normal module mode, all the SoCs in the multi SoC module 910 are in the normal mode, and in the half low power module mode, some SoCs in the multi SoC module 910 are in the normal mode and the remaining SoCs are in the low power mode. In addition, in the low power module mode, all the SoCs in the multi SoC module 910 are in the low power mode, and in the power off module mode, all the SoCs in the multi SoC module 910 are in the power off mode.

Specifically, as the processor 930 determines to supply power to the multi SoC module 910 before the vehicle starts up, the processor 930 sets the module mode of the multi SoC module 910 to the power on module mode, thereby controlling each of the plurality of SoCs to be in the power on mode.

Thereafter, when the module mode is in the power on module mode, the processor 930 receives, for example, the accessory (ACC) ON signal through an interface (not shown), determines that the state of the vehicle is in the driving state as the vehicle starts up, and changes the module mode of the multi SoC module 910 from the power on module mode to the normal module mode and switches each of the plurality of SoCs from the power on mode to the normal mode.

The processor 930 may change the module mode of the multi SoC module 910 from the normal module mode to the half low power module mode in response to the capacity of the main battery in the vehicle in the driving state being lower than a set first reference value. In this case, as the processor 930 changes the module mode to the half low power module mode, the processor 930 may maintain some of the plurality of SoCs supplied with power from the main battery in the normal mode while switching the remaining SoCs to the low power mode. That is, the processor 930 may maintain a first SoC (for example, a SoC performing any one of a cluster function, a navigation function, an autonomous function, and an advanced driver assistance systems (ADAS) function) associated with safety in the normal mode, while switching remaining second SoCs (for example, a SoC associated with infotainment) other than the first SoC to the low power mode, thereby allowing the vehicle to safely travel and reducing power consumed in the main battery.

In addition, the processor 930 may allow the backup battery, instead of the main battery, to supply power to the first SoC in response to the capacity of the main battery being lower than a set second reference value, and switch the second SoC from the low power mode to the power off mode, thereby allowing the vehicle to safely travel using the backup battery and reducing the capacity of the backup battery as slowly as possible to increase the driving time. Here, the second reference value is lower than the first reference value. In this case, the processor 930 may output a warning message indicating that the power in the backup battery is insufficient to induce charging of the battery (for example, the backup battery or the main battery).

In addition, in response to the capacity of the backup battery being lower than the set second reference value, the processor 930 may change the module mode of the multi SoC module 910 from the half low power module mode to the power off module mode, and also switch the first SoC from the normal mode to the power off mode, thereby switching all the SoCs in the multi SoC module 910 to the power off mode. In this case, the processor 930 may output a danger message indicating that the backup battery power is insufficient before the module mode is changed from the half low power module mode to the power off module mode, and move the vehicle to a safe location (for example, a charging station or a parking lot), thereby preventing traffic accidents.

Meanwhile, the processor 930 may change the module mode from the normal module mode to the low power module mode in response to the state of the vehicle entering the standby state from the driving state, thereby switching each of the plurality of SoCs from the normal mode to the low power mode and supplying power from the backup battery to each of the plurality of SoCs switched to the low power mode. In this case, the processor 930 may cause the vehicle to enter the standby state from the driving state based on a microcomputer (micom) detecting the accessory (ACC) OFF signal from controller area network (CAN) data received through the interface or detecting the danger signal indicating that the main battery is insufficient from the CAN data in response to the capacity of the main battery being lower than a set standby switching reference value. Here, the standby switching reference value may be lower than the first reference value.

When switching to the low power mode of the plurality of SoCs according to the change to the low power module mode, the processor 930 may first switch a master SoC in the multi SoC module 910 to the low power mode, and switch a slave SoC in the multi SoC module 910 to the low power mode using the master SoC. In detail, the processor 930 may provide a low power mode switching signal to the master SoC in the multi SoC module 910 to switch the master SoC from the normal mode to the low power mode, and transfer the low power mode switching signal to the slave SoC in the multi SoC module from the master SoC through Ethernet, thereby switching the slave SoC from the normal mode to the low power mode.

As another example of controlling the modes of the plurality of SoCs, the processor 930 may control the modes of the plurality of SoCs based on throughput (or usage) in the plurality of SoCs in the multi SoC module 910. For example, the processor 930 determines whether there is a low processing SoC, which processes less data than a set first throughput, among the plurality of SoCs, and in response to a determination that there is a low processing SoC, the processor 930 changes the module mode of the multi SoC module 910 from the normal module mode to the half low power module mode regardless of the capacity of the battery, thereby maintaining the remaining SoCs other than the low processing SoC in the normal mode while switching the low processing SoC from the normal mode to the low power mode. In other words, the processor 930 may switch a SoC that has a significantly lower usage than other SoCs to the low power mode.

In this case, when there is a plurality of SoCs performing the same function, the processor 930 switches the low processing SoC, which processes less data than the set first throughput, among the plurality of SoCs, from the normal mode to the low power mode, thereby reducing wastage of power.

As another example, the processor 930 may calculate the sum of the throughputs of the plurality of SoCs in the multi SoC module as a total throughput, and determine whether the calculated total throughput is less than the set second throughput (which may be higher than the first throughput). In response to a determination that the total throughput is less than the second throughput, the processor 930 may change the module mode of the multi SoC module 910 from the normal module mode to the half low power module mode regardless of the capacity of the battery. In this case, the processor 930 may select as many SoCs as the number of SoCs capable of processing the total throughput from the plurality of SoCs, and maintain the selected SoCs in the normal mode, while switching the remaining SoCs, other than the selected SoCs, to the low power mode.

In response to at least one of the plurality of SoCs being switched from the normal mode to the low power mode according to set conditions, the processor 930 may activate a memory selected from the plurality of memories 921 corresponding to the SoC that has been switched to the low power mode and an interrupt digital signal processor (DSP) in the switched SoC, and deactivate the remaining memories other than the activated memory (deactivated memories) and all components in the switched SoC other than the activated interrupt DSP. Here, the set conditions may be, for example, any one of a module mode change based on the capacity of the battery, a module mode change in response to the state of the vehicle entering into the standby state, and a module mode change based on the throughput in the plurality of SoCs.

In this case, the processor 930 supplies power to the activated memory and the interrupt DSP in the switched SoC, and stops supplying power to the remaining components other than the activated memory and the interrupt DSP in the switched SoC, thereby reducing power consumed by the remaining components other than the activated memory and the interrupt DSP in the SoC.

When the memory is used, in response to an application being activated in a vehicle in a driving state, the processor 930 may, for example, store data on the application at an allocated address in at least one of the plurality of memories 921 corresponding to a specific SoC associated with the application among the plurality of SoCs using a memory management unit (MMU) in the specific SoC. In this case, the processor 930 may separately store the data on the application at allocated addresses in two or more memories, respectively, according to a set storage criterion (for example, different types of information (basic information and additional information), a data size larger than or equal to a set value, and execution timing).

Thereafter, in response to the specific SoC being switched from the normal mode to the low power mode according to the set conditions, the processor 930 may reallocate data on at least one application stored in the plurality of memories 921 to an address in the memory selected from the plurality of memories 921 and store the data therein using the MMU, and activate the selected memory to supply power thereto and stop supplying power to the remaining memories other than the activated memory. Here, the set conditions may be, for example, any one of a module mode change based on the capacity of the battery, a module mode change in response to the state of the vehicle entering into the standby state, and a module mode change based on the throughput in the plurality of SoCs.

In this case, the processor 930 may select, from the activated applications, an application associated with a function that was last used in the vehicle (that is, a function used in a last mode) before the specific SOC was switched from the normal mode to the low power mode, and store the selected application in the selected memory. In addition, the processor 930 may further store data on a home screen associated with the function performed by the specific SoC in the selected memory. In this case, the processor 930 may determine whether the home screen is required for the function performed in the specific SoC, and in response to a determination that the home screen is required, the processor 930 may further store data associated with the home screen in the selected memory. For example, the cluster function may require the home screen.

When selecting the memory from the plurality of memories 921 corresponding to the SoC that has been switched to the low power mode, the processor 930 may select a memory from the plurality of memories 921 corresponding to the SoC switched to the low power mode based on the set criterion. For example, the processor 930 may select, for example, one memory at random, or select a memory in which a relatively large amount of data on an application is stored based on a confirmation that the capacity of each memory in the plurality of memories 921 is the same. In this case, when the data on one or more applications stored in the plurality of memories 921 cannot all be stored in one memory, the processor 930 may select a number of memories that is capable of storing all the data on the applications.

As another example of selecting the memory, the processor 930 may select, for example, a memory having the lowest capacity from the memories capable of storing all the data on one or more applications stored in the plurality of memories 921 based on a confirmation that the capacities of each memory in the plurality of memories 921 are different.

Each memory in the plurality of memories 921 may perform a function of temporarily storing data processed by the processor 930. Here, the memory may be, for example, a volatile memory such as DRAM, SRAM, or SDRAM, but is not limited thereto.

Figure 10:
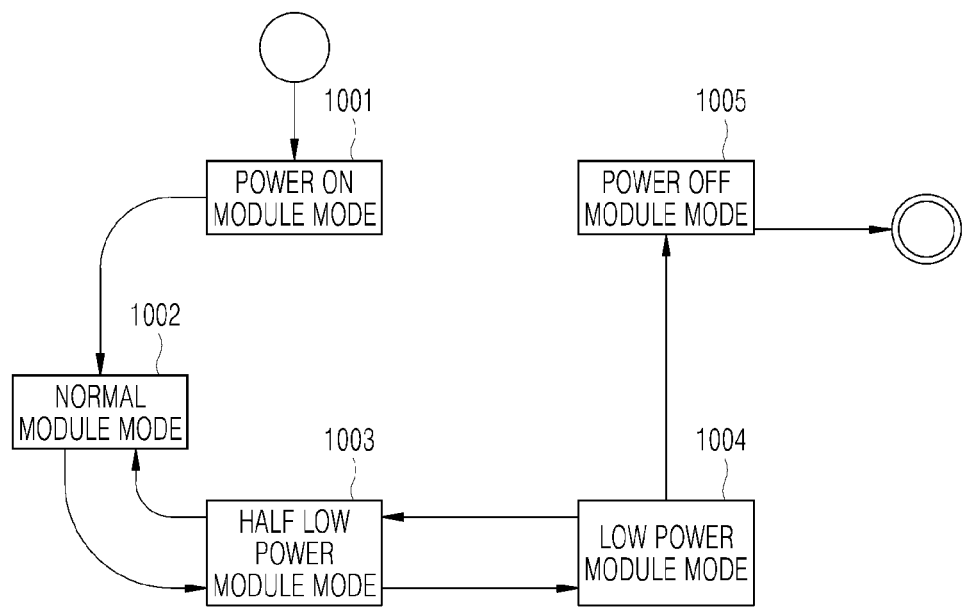
FIG. 10 is a diagram for describing an example of a module mode of the multi SoC module in the apparatus for managing power of a multi SoC module in a vehicle according to an embodiment of the present disclosure.

FIG. 10 is a diagram for describing an example of the module mode of the multi SoC module in the apparatus for managing power of a multi SoC module in a vehicle according to an embodiment of the present disclosure.

Referring to FIG. 10, the apparatus for managing power of a multi SoC module in a vehicle may change (or set) the module mode of the multi SoC module to any one of a power on module mode 1001, a normal module mode 1002, a half low power module mode 1003, a low power module mode 1004, and a power off module mode 1005. The apparatus for managing power of a multi SoC module in a vehicle may change the module mode of the multi SoC module based on various set conditions.

Here, the apparatus for managing power of a multi SoC module in a vehicle may, for example, set the module mode of the multi SoC module as the power on module mode 1001 based on the fact that power is being supplied to the multi SoC module before the vehicle starts up, thereby setting all of the plurality of SoCs in the multi SoC module to the power on mode.

In addition, the apparatus for managing power of a multi SoC module in a vehicle may, for example, receive the ACC ON signal in a state where the module mode is in the power on module mode, and switch the plurality of SoCs in the multi SoC module from the power on mode to the normal mode in response to the change of the module mode from the power on module mode 1001 to the normal module mode 1002 based on the change of the state of the vehicle to the driving state as the vehicle starts up.

The apparatus for managing power of a multi SoC module in a vehicle may, for example, switch some of the plurality of SoCs in the multi SoC module (for example, SoCs associated with safety) from the normal mode to the low power mode in response to a change of the module mode from the normal module mode 1002 to the half low power module mode 1003 based on a reduction in the capacity of the main battery in the vehicle (for example, the capacity of the main battery being lower than the set first reference value). However, the present disclosure is not limited thereto, and the module mode may be switched in the opposite direction. For example, the apparatus for managing power of a multi SoC module in a vehicle may change the module mode from the half low power module mode 1003 to the normal module mode 1002 based on an increase in the capacity of the main battery in the vehicle due to charging.

The apparatus for managing power of a multi SoC module in a vehicle may, for example, receive a signal indicating that the capacity of the main battery in the vehicle is insufficient (for example, lower than the set standby switching reference value) or an ACC OFF signal, and switch (or maintain) all of the plurality of SoCs in the multi SoC module to the low power mode in response to a change of the module mode from the half low power module mode 1003 to the low power module mode 1004 based on the state of the vehicle entering into the standby state as the vehicle is turned off. However, the present disclosure is not limited thereto, and the module mode may be switched in the opposite direction. For example, the apparatus for managing power of a multi SoC module in a vehicle may change the module mode from the low power module mode 1004 to the half low power module mode 1003 based on an increase in the capacity of the main battery in the vehicle due to charging.

The apparatus for managing power of a multi SoC module in a vehicle may, for example, switch the plurality of SoCs in the multi SoC module to the power off mode in response to the change of the module mode from the low power module mode 1004 to the power off module mode 1005 based on the capacity of the backup battery in the vehicle being insufficient (for example, lower than the set second reference value).

Meanwhile, the apparatus for managing power of a multi SoC module in a vehicle is not limited to the change of the module mode of the multi SoC module as in the examples described above, and may change the module mode in various ways based on at least one of the state of the vehicle or the change in the capacity of the battery in the vehicle. For example, the apparatus for managing power of a multi SoC module in a vehicle may change the module mode of the multi SoC module from the normal mode 1002 to the low power mode 1004 upon the vehicle being turned off in a state where the module mode of the multi SoC module is in the normal module mode 1002.

Figure 11:
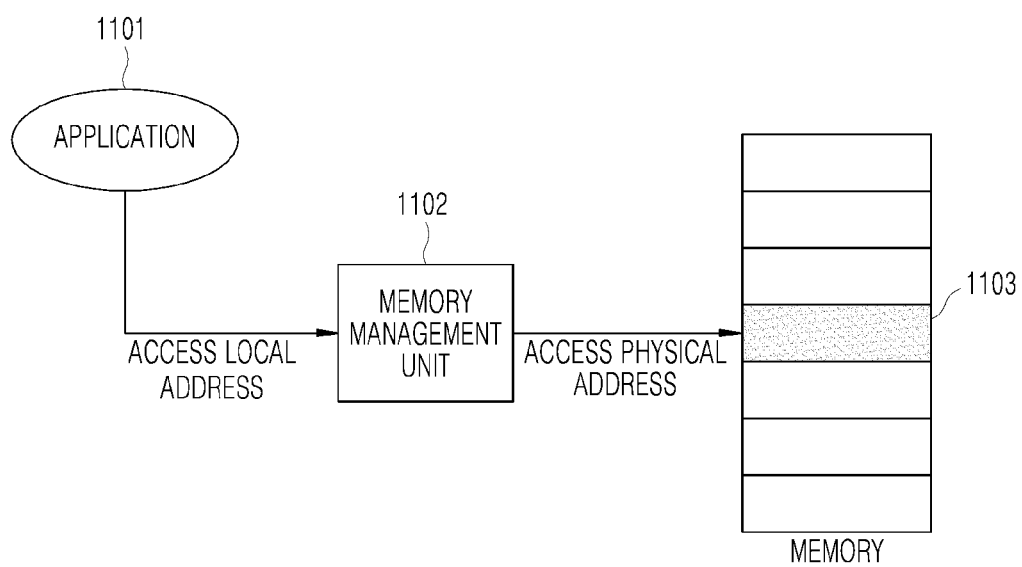
FIGS. 11 to 13 are diagrams for describing an example of managing a plurality of memories corresponding to SoCs in the apparatus for managing power of a multi SoC module in a vehicle according to an embodiment of the present disclosure.
Figure 12:
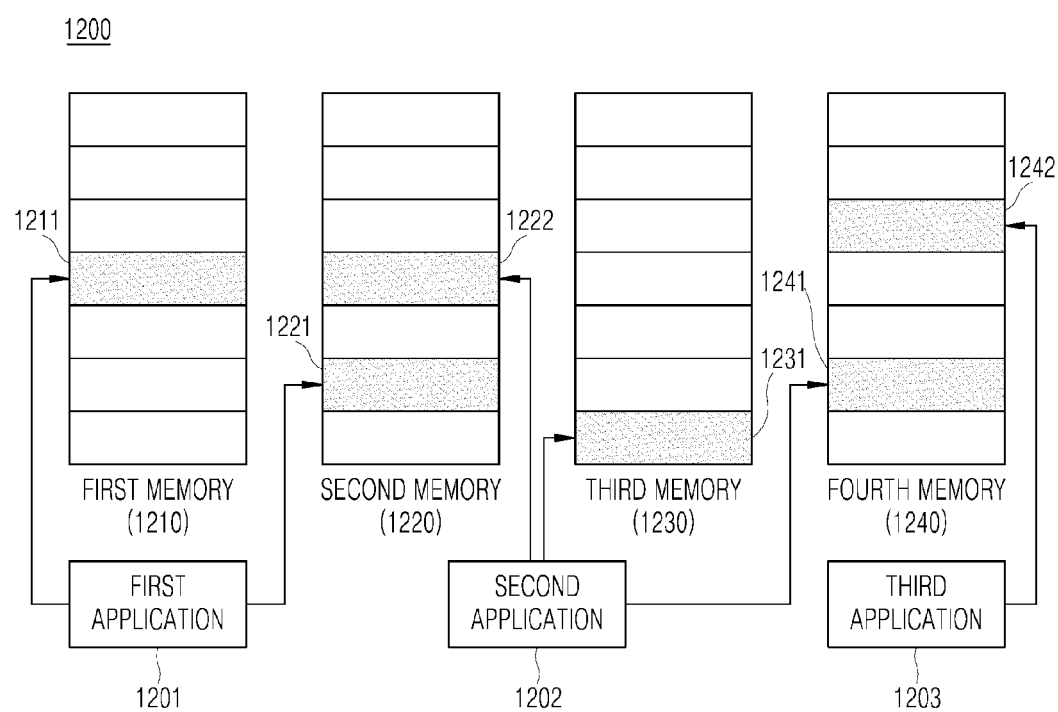
Figure 13:
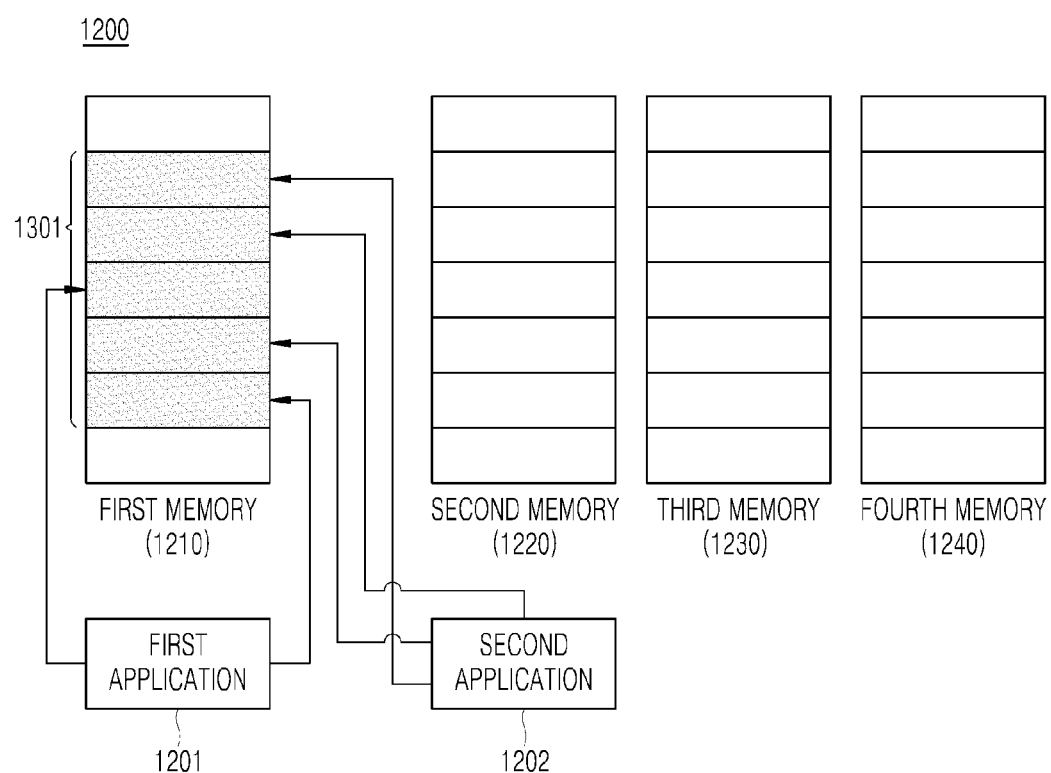

FIGS. 11 to 13 are diagrams for describing an example of managing a plurality of memories corresponding to SoCs in the apparatus for managing power of a multi SoC module in a vehicle according to an embodiment of the present disclosure.

Referring to FIG. 11, in response to an application 1101 being activated in a vehicle, the apparatus for managing power of a multi SoC module in a vehicle may store data on the application 1101 at an allocated address 1103 in at least one of a plurality of memories corresponding to the SoC using a memory management unit (MMU) 1102 in an SoC associated with the application 1101.

In this case, the apparatus for managing power of a multi SoC module in a vehicle may separately store the data on the application at allocated addresses in two or more memories, respectively, according to a set storage criterion (for example, different types of information (basic information and additional information), a data size larger than or equal to a set value, and execution timing).

As shown in FIG. 12, upon activation of a first application 1201, for example, the apparatus for managing power of a multi SoC module in a vehicle may separately store data on the first application 1201 at a first address 1211 in a first memory 1210 and a second address 1201 in a second memory 1220 among a plurality of memories 1200 according to a set storage criterion. In addition, similar to the first application 1201, upon activation of a second application 1202, the apparatus for managing power of a multi SoC module in a vehicle may separately store data on the second application 1202 at a third address 1222 in a second memory 1220, a fourth address 1231 in a third memory 1230, and a fifth address 1241 in a fourth memory 1240 among the plurality of memories 1200 according to the set storage criterion.

In addition, upon activation of a third application 1203, the apparatus for managing power of a multi SoC module in a vehicle may store data on the third application 1203 in a sixth address 1242 in a fourth memory 1240 among the plurality of memories 1200 according to the set storage criterion.

Meanwhile, in response to the SoC switching from the normal mode to the low power mode, the apparatus for managing power of a multi SoC module in a vehicle may select, from the activated applications, an application associated with the function that was last used in the vehicle, and store data on the selected application in the selected memory.

As shown in FIG. 13, in response to the SoC switching from the normal mode to the low power mode, the apparatus for managing power of a multi SoC module in a vehicle may, for example, select the first and second applications 1201 and 1202 associated with the function that was last used in the vehicle from the activated first, second, or third applications 1201, 1202, and 1203, and store data on the first and second applications 1201 and 1202 in a first memory 1210 selected from the plurality of memories 1200. In this case, the apparatus for managing power of a multi SoC module in a vehicle may reallocate the data on the first and second applications 1201 and 1202 to an address 1301 in the first memory 1210 and store the data therein using the MMU, and supply power to the first memory 1210 and stop supplying power to second, third, and fourth memories 1220, 1230, and 1240 other than the first memory 1210.

Figure 14:
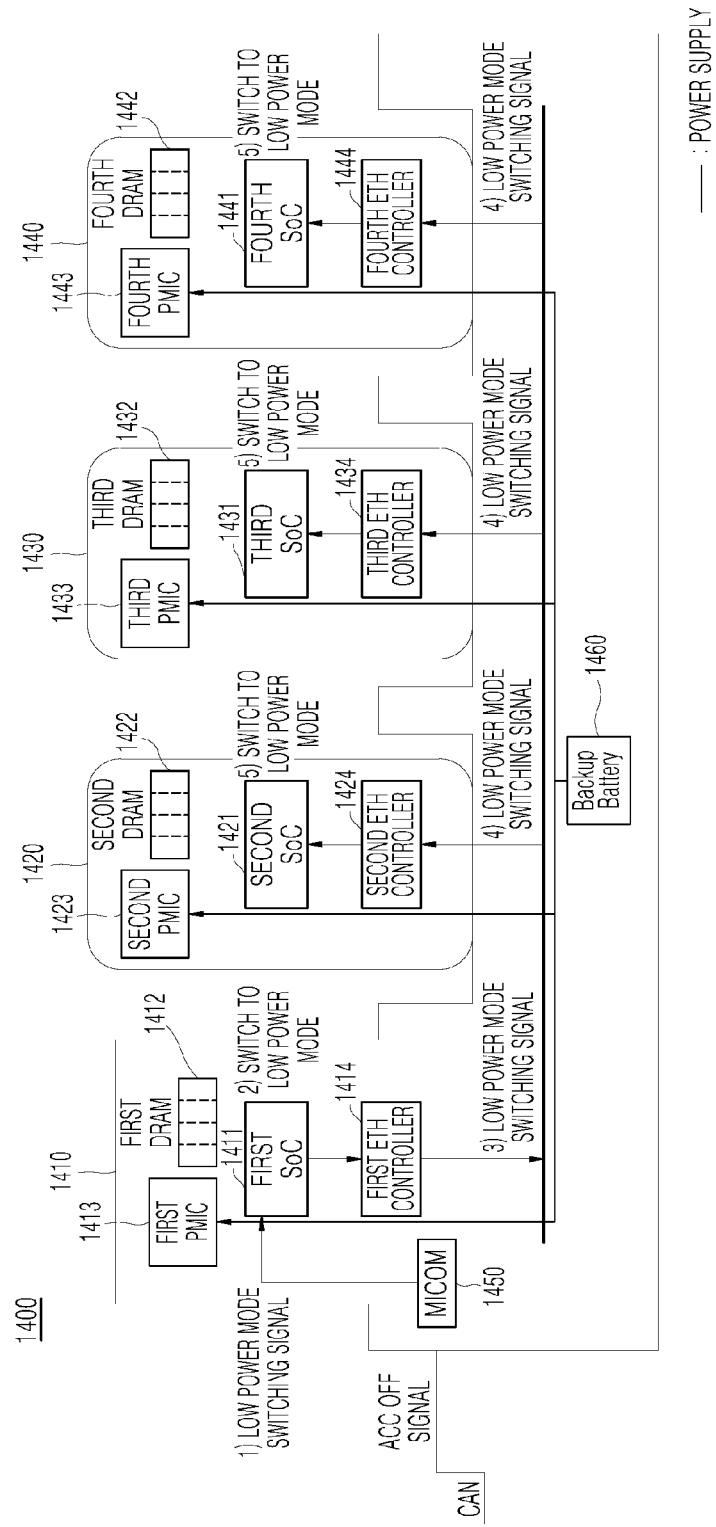
FIG. 14 is a diagram for describing an example of an operation when a module mode of the multi SoC module is changed to a low power module mode in the apparatus for managing power of a multi SoC module in a vehicle according to an embodiment of the present disclosure.

FIG. 14 is a diagram for describing an example of an operation when a module mode of the multi SoC module is changed to a low power module mode in the apparatus for managing power of a multi SoC module in a vehicle according to an embodiment of the present disclosure.

Referring to FIG. 14, the apparatus for managing power of a multi SoC module in a vehicle includes, for example, a multi SoC module including a plurality of SoCs, and a memory module including a plurality of memories corresponding to each of the plurality of SoCs.

Here, the apparatus for managing power of a multi SoC module in a vehicle may include one slot that is constituted by a power management IC (PMIC) and an Ethernet controller together with one SoC and a plurality of memories (for example, a DRAM) corresponding to the SoC. For example, the apparatus for managing power of a multi SoC module in a vehicle may include a first slot 1410 that is constituted by a first SoC 1411 (for example, a SoC performing a cluster function), a plurality of first DRAMs 1412 (for example, 4 GB DRAMS) corresponding to the first SoC 1411, a first PMIC 1413, and a first Ethernet controller 1414. Here, the plurality of first DRAMs 1412 may correspond to the plurality of memories 1200 in FIG. 12, and one DRAM may be, for example, the first memory 1210.

In addition, the apparatus for managing power of a multi SoC module in a vehicle may further include a second slot 1420 that is constituted by a second SoC 1421 (for example, a SoC associated with infotainment), a plurality of second DRAMs 1422 corresponding to the second SoC 1421, a second PMIC 1423, and a second Ethernet controller 1424.

In addition, the apparatus for managing power of a multi SoC module in a vehicle may further include third and fourth slots 1430 and 1440 having the same shape as the first and second slots 1410 and 1420, and a microcomputer (micom) 1450. Here, the micom 1450 may be connected to a controller area network (CAN) in a wired (or wireless) manner, and may transmit a signal received from the CAN to the first SoC 1411 in the first slot 1410.

Meanwhile, the first SoC 1411 in the first slot 1410 may be designated in advance as a master SoC, and the second, third, and fourth SoCs 1421, 1431, and 1441 in the second, third, and fourth slots 1420, 1430, and 1440 are slave SoCs. Here, the third SoC 1431 may be, for example, a SoC that performs a telemetrics function, and the fourth SoC 1441 may be a SoC that performs an ADAS function.

In addition, the first slot 1410 including the master SoC may not be detachable, and the second, third, and fourth slots 1420, 1430, and 1440 including the slave SoC may be detachable.

The apparatus for managing power of a multi SoC module in a vehicle may, for example, change the module mode of the multi SoC module to the low power module mode and switch the first to fourth SoCs 1411, 1421, 1431, and 1441 to the low power mode, based on the micom 1450 receiving an ACC OFF signal (that is, the vehicle being turned off), inputted from the CAN.

In this case, in response to the micom 1450 receiving the ACC OFF signal, the apparatus for managing power of a multi SoC module in a vehicle may provide a low power mode switching signal to the first SoC 1411, which is a master SoC, thereby switching the first SoC 1411 to the low power mode.

Here, the apparatus for managing power of a multi SoC module in a vehicle may remove data associated with unnecessary applications (for example, the remaining applications other than the applications associated with the last used function) from the plurality of first DRAMs 1412 corresponding to the first SoC 1411, thereby terminating the unnecessary applications. Alternatively, the apparatus for managing power of a multi SoC module in a vehicle may arrange applications by storing data associated with necessary applications in the first DRAM selected from the plurality of first DRAMs 1412, thereby efficiently using the plurality of first DRAMs 1412. Here, the apparatus for managing power of a multi SoC module in a vehicle may supply power to the selected first DRAM and stop supplying power to the remaining first DRAMs other than the selected first DRAM. In addition, the apparatus for managing power of a multi SoC module in a vehicle may activate an interrupt DSP in the first SoC 1411 and deactivate all components in the first SoC 1411 other than the interrupt DSP.

Subsequently, the apparatus for managing power of a multi SoC module in a vehicle may simultaneously transmit the low power mode switching signal from the first SoC 1411 to the second, third, and fourth Ethernet controllers 1424, 1434, and 1444 in the second, third, and fourth slots 1420, 1430, and 1440, respectively, through the Ethernet by using the first Ethernet controller 1414. In this case, the apparatus for managing power of a multi SoC module in a vehicle may transmit the low power mode switching signal received by the second, third, and fourth Ethernet controllers 1424, 1434, and 1444 to each of the second, third, and fourth SoCs 1421, 1431, and 1441, which are slave SoCs, so as to switch the second, third, and fourth SoCs 1421, 1431, and 1441 to the low power mode, thereby performing quick mode switching.

Here, similar to the case where the first SoC 1411 is switched to the low power mode, the apparatus for managing power of a multi SoC module in a vehicle may arrange only the data on the necessary applications for each of the plurality of second, third, and fourth DRAMs 1422, 1432, and 1442 corresponding to each of the second, third, and fourth SoCs 1421, 1431, and 1441, so that only the data on the necessary applications is stored in the selected DRAM, thereby efficiently using the plurality of second, third, and fourth DRAMs 1422, 1432, and 1442 and also supplying power only to the selected DRAM. In addition, the apparatus for managing power of a multi SoC module in a vehicle may activate each interrupt DSP for the second, third, and fourth SoCs 1421, 1431, and 1441 in the same way as the first SoC 1411, and deactivate all the components in the second, third, and fourth SoCs 1421, 1431, and 1441 other than the interrupt DSP.

The apparatus for managing power of a multi SoC module in a vehicle may supply only the minimum power required for the plurality of DRAMs and the plurality of SoCs, thereby reducing the power consumption.

Meanwhile, the apparatus for managing power of a multi SoC module in a vehicle may supply power from the backup battery 1460 in the vehicle to the first to fourth PMICs 1413, 1423, 1433, and 1443 in the first to fourth slots 1410, 1420, 1430, and 1440, and control power use of the first to fourth slots 1410, 1420, 1430, and 1440 using the first to fourth PMICs 1413, 1423, 1433, and 1443. That is, the apparatus for managing power of a multi SoC module in a vehicle may perform control such that power is supplied only to the components required for each of the first to fourth slots 1410, 1420, 1430, and 1440 (for example, the DRAM selected to store the data on the necessary applications, the interrupt DSP activated in the SoC, and the Ethernet controller), thereby using power efficiently without wasting power.

Figure 15:
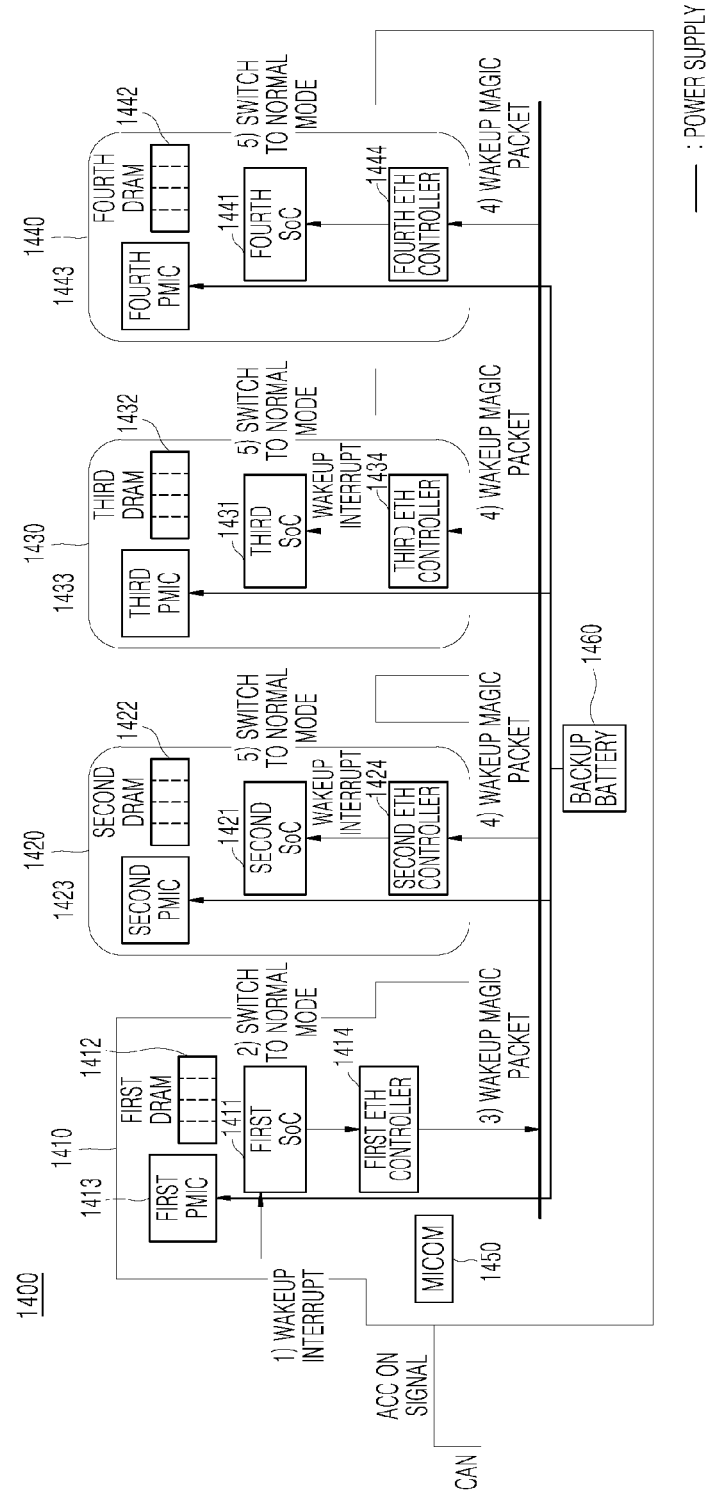
FIG. 15 is a diagram for describing an example of an operation when the module mode of the multi SoC module is changed from the low power module mode to a normal module mode in the apparatus for managing power of a multi SoC module in a vehicle according to an embodiment of the present disclosure.

FIG. 15 is a diagram for describing an example of an operation when a module mode of the multi SoC module is changed from a low power module mode to a normal module mode in an apparatus for managing power of a multi SoC module in a vehicle according to an embodiment of the present disclosure. Here, the configuration of the apparatus for managing power of a multi SoC module in a vehicle is the same as that of FIG. 14, and description thereof will therefore be omitted.

Referring to FIG. 15, an apparatus for managing power of a multi SoC module in a vehicle may change the module mode of the multi SoC module from the low power module mode to the normal module mode and switch the first to fourth SoCs 1411, 1421, 1431, and 1441 from the low power mode to the normal mode, for example, based on the micom 1450 receiving an ACC ON signal (that is, the vehicle being started up) inputted from the CAN.

In this case, in response to the micom 1450 receiving the ACC ON signal, the apparatus for managing power of a multi SoC module in a vehicle may transmit a wakeup interrupt signal to the first SoC 1411, which is a master SoC, thereby waking up the first SoC 1411 and switching the first SoC 1411 to the normal mode.

Here, the apparatus for managing power of a multi SoC module in a vehicle may supply power to all of the plurality of first DRAMs 1412 corresponding to the first SoC 1411, and activate all the components in the first SoC 1411.

Subsequently, the apparatus for managing power of a multi SoC module in a vehicle may simultaneously transmit a wakeup magic packet (or a wakeup interrupt signal) from the first SoC 1411 to each of the second, third and fourth Ethernet controllers 1424, 1434, and 1444 in the second, third, and fourth slots 1420, 1430, and 1440 through the Ethernet by using the first Ethernet controller 1414. In this case, the apparatus for managing power of a multi SoC module in a vehicle may transmit the wakeup interrupt signal received by the second, third, and fourth Ethernet controllers 1424, 1434, and 1444 to each of the second, third, and fourth SoCs 1421, 1431, and 1441, which are slave SoCs, so as to wake up the second, third, and fourth SoCs 1421, 1431, and 1441, thereby performing quick mode switching from the low power mode to the normal mode.

Here, similar to the case where the first SoC 1411 is switched to the low power mode, the apparatus for managing power of a multi SoC module in a vehicle may supply power to all of the plurality of second, third, and fourth DRAMs 1422, 1432, and 1442 corresponding to each of the second, third, and fourth SoCs 1421, 1431, and 1441, and activate all the components in the second, third, and fourth SoCs 1421, 1431, and 1441.

At this time, the apparatus for managing power of a multi SoC module in a vehicle may quickly use the function that was last used in the vehicle without delay by using the data stored in the DRAM to which power is continuously supplied, that is, the data on the application associated with the last used function. For example, when a vehicle enters a standby state from a driving state, if 'radio' was the function that was last activated before the module mode of the multi SoC module was changed to the low power module mode (the last mode before entering the standby state), the apparatus for managing power of a multi SoC module in a vehicle may activate the 'radio' in response to the module mode being changed from the low power module mode to the normal module mode, thereby allowing a driver to quickly return to the environment used before entering the standby state.

For reference, the examples of operations in the apparatus for managing power of a multi SoC module in a vehicle described with reference to FIGS. 10 to 15 may be implemented by a processor in the apparatus for managing power of a multi SoC module in a vehicle.

Figure 16:
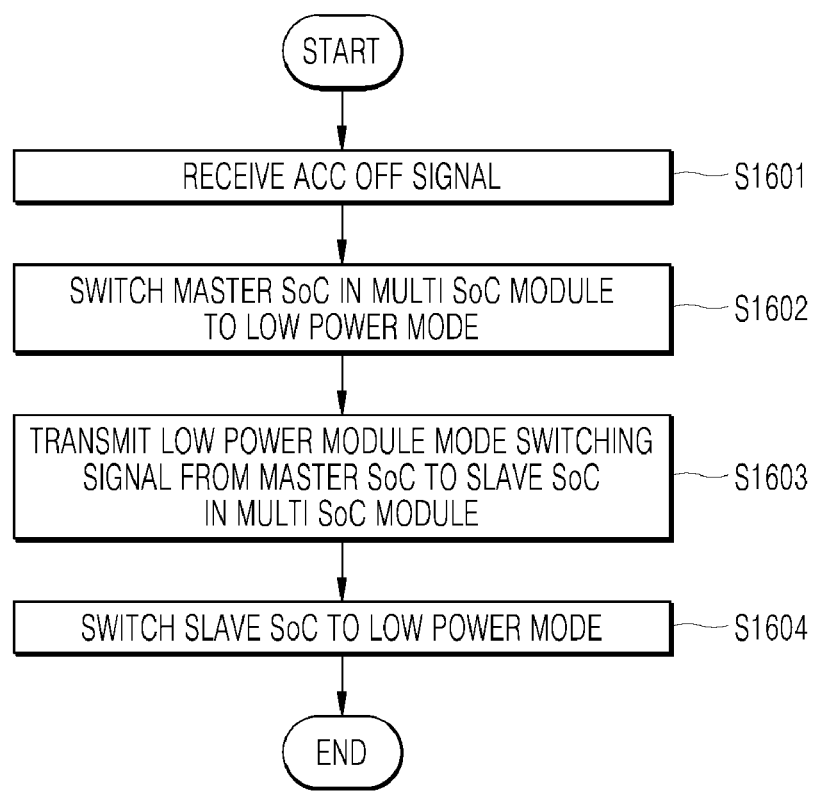
FIG. 16 is a flowchart showing an operation method when the module mode of the multi SoC module is changed to the low power module mode in the apparatus for managing power of a multi SoC module in a vehicle according to an embodiment of the present disclosure.

FIG. 16 is a flowchart showing an operation method when the module mode of the multi SoC module is changed to the low power module mode in the apparatus for managing power of a multi SoC module in a vehicle according to an embodiment of the present disclosure.

Referring to FIG. 16, in step S1601, the apparatus for managing power of a multi SoC module in a vehicle may receive an ACC OFF signal. The apparatus for managing power of a multi SoC module in a vehicle may receive the ACC OFF signal inputted from a CAN in a microcomputer (micom).

In step S1602, the apparatus for managing power of a multi SoC module in a vehicle may transmit the ACC OFF signal to the master SoC in the multi SoC module in response to receiving the ACC OFF signal, thereby switching the master SoC to the low power mode.

At this time, the apparatus for managing power of a multi SoC module in a vehicle may remove data associated with unnecessary applications (for example, the remaining applications other than the application associated with the last used function) from the plurality of memories corresponding to the master SoC, and store necessary applications in a memory selected from the plurality of memories, thereby efficiently using the plurality of memories while terminating the unnecessary applications. Here, the apparatus for managing power of a multi SoC module in a vehicle may supply power to the selected memory and stop supplying power to the remaining memories other than the selected memory.

In addition, the apparatus for managing power of a multi SoC module in a vehicle may activate an interrupt DSP in the master SoC and deactivate all components in the master SoC other than the interrupt DSP.

In step S1603, the apparatus for managing power of a multi SoC module in a vehicle may transmit a low power mode switching signal from the master SoC to the slave SoC in the multi SoC module through Ethernet.

In step S1604, the apparatus for managing power of a multi SoC module in a vehicle may switch the slave SoC in the multi SoC module to the low power mode.

In this case, similar to the master SoC, the apparatus for managing power of a multi SoC module in a vehicle may remove data associated with unnecessary applications (for example, the remaining applications other than the application associated with the last used function) from the plurality of memories corresponding to the slave SoC, and store necessary applications in a memory selected from the plurality of memories, thereby efficiently using the plurality of memories while terminating the unnecessary applications. Here, the apparatus for managing power of a multi SoC module in a vehicle may supply power to the selected memory and stop supplying power to the remaining memories other than the selected memory.

In addition, the apparatus for managing power of a multi SoC module in a vehicle may activate an interrupt DSP in the slave SoC and deactivate all components in the slave SoC other than the interrupt DSP.

Figure 17:
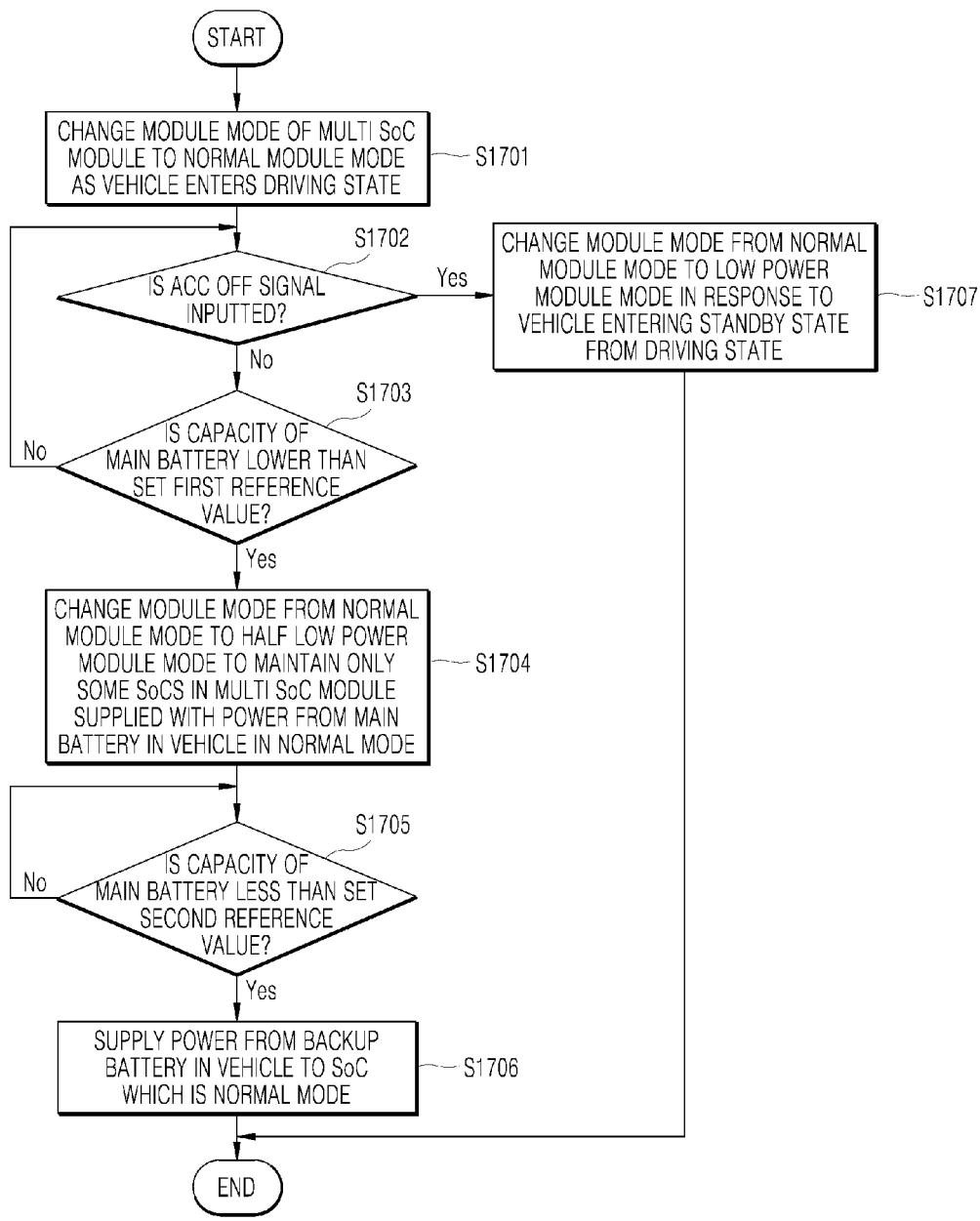
FIG. 17 is a flowchart showing an example of a method for managing power of a multi SoC module in a vehicle according to an embodiment of the present disclosure.

FIG. 17 is a flowchart showing an example of a method for managing power of a multi SoC module in a vehicle according to an embodiment of the present disclosure.

Referring to FIG. 17, in step S1701, the apparatus for managing power of a multi SoC module in a vehicle may receive the ACC ON signal, and change the state of the vehicle to the driving state as the vehicle starts up. In this case, the apparatus for managing power of a multi SoC module in a vehicle may switch the plurality of SoCs in the multi SoC module from the power on mode to the normal mode in response to the module mode of the multi SoC module being changed from the power on module mode to the normal module mode based on the state of the vehicle being changed to the driving state.

In step S1702, the apparatus for managing power of a multi SoC module in a vehicle may check whether the ACC OFF signal has been inputted, and upon a determination that the ACC OFF signal has not been inputted as a result of the checking, the capacity of the main battery in the vehicle may be checked. While the apparatus for managing power of a multi SoC module in a vehicle may check the capacity of the main battery in the vehicle in response to a determination that the ACC OFF signal has not been inputted as a result of the checking, the present disclosure is not limited thereto, and the apparatus for managing power of a multi SoC module in a vehicle may check the capacity of the backup battery in the vehicle as well as the capacity of the main battery in the vehicle at each set period. In step S1702, while the apparatus for managing power of a multi SoC module in a vehicle may check whether the ACC OFF signal has been inputted, the present disclosure is not limited thereto, and the apparatus for managing power of a multi SoC module in a vehicle may continuously perform checking while the state of the vehicle is in the driving state.

In step S1703, the apparatus for managing power of a multi SoC module in a vehicle checks whether the capacity of the main battery in the vehicle is lower than a set first reference value. In response to the capacity of the main battery being lower than the set first reference value as a result of the checking, in step S1704 the apparatus for managing power of a multi SoC module in a vehicle may change the module mode of the multi SoC module from the normal module mode to the half low power module mode. In this case, in response to the module mode being changed from the normal module mode to the half low power module mode, the apparatus for managing power of a multi SoC module in a vehicle may maintain a first SoC associated with safety (for example, a SoC performing any one of a cluster function, a navigation function, an autonomous function, or an advanced driver assistance system (ADAS) function) among the plurality of SoCs in the multi SoC module supplied with power from the main battery, while switching remaining second SoCs other than the first SoC to the low power mode.

Upon a determination that the capacity of the main battery in the vehicle is not lower than the set first reference value as a result of the checking in step S1703, the process returns to step S1702, and the apparatus for managing power of a multi SoC module in a vehicle may check whether the ACC OFF signal has been inputted.

In step S1705, the apparatus for managing power of a multi SoC module in a vehicle checks whether the capacity of the main battery in the vehicle is lower than the set second reference value. In response to the capacity of the main battery being lower than the set second reference value as a result of the checking, in step S1706 power is supplied from the backup battery, instead of the main battery, to the first SoC, which is in the normal mode, and the second SoC is switched from the low power mode to the power off mode. Here, the set second reference value is lower than the set first reference value.

Alternatively, upon a determination that the capacity of the main battery in the vehicle is not below the set second reference value as a result of the checking in S1705, the apparatus for managing power of a multi SoC module in a vehicle may maintain the first SoC associated with safety in the normal mode and supply power from the main battery, while checking the capacity of the main battery in the vehicle at each set period.

Subsequently, the apparatus for managing power of a multi SoC module in a vehicle may check whether the capacity of the backup battery in the vehicle is lower than the set second reference value, and in response to the capacity of the backup battery being lower than the set second reference value as a result of the checking, change the module mode from the half low power module mode to the power off module mode. That is, the apparatus for managing power of a multi SoC module in a vehicle may also switch the first SoC from the normal mode to the power off mode to thereby switch all the SoCs in the multi SoC module to the power off mode. Here, the apparatus for managing power of a multi SoC module in a vehicle may output a danger message indicating that the backup battery power is insufficient before the module mode is changed from the half low power module mode to the power off module mode, and move the vehicle to a safe location (for example, a charging station or a parking lot) so as to prevent traffic accidents.

Meanwhile, in response to a determination that the ACC OFF signal has been inputted as a result of the checking in step S1702, the apparatus for managing power of a multi SoC module in a vehicle may cause the vehicle to enter the standby state from the driving state in step S1707. Here, the apparatus for managing power of a multi SoC module in a vehicle changes the module mode from the normal module mode to the low power module mode in response to the state of the vehicle entering the standby state from the driving state, thereby switching each of the plurality of SoCs from the normal mode to the low power mode. In this case, the apparatus for managing power of a multi SoC module in a vehicle supplies power from the backup battery in the vehicle to each of the plurality of SoCs that have been switched to the low power mode.

When checking for input of the ACC OFF signal, the apparatus for managing power of a multi SoC module in a vehicle may check whether the ACC OFF signal has been inputted by detecting the ACC OFF signal from CAN data. In addition, the apparatus for managing power of a multi SoC module in a vehicle may cause the vehicle to enter the standby state from the driving state based on a danger signal indicating that the capacity in the main battery is insufficient being detected from the CAN data in response to the capacity of the main battery in the vehicle being lower than a set standby switching reference value (lower than the first reference value).

In addition, the apparatus for managing power of a multi SoC module in a vehicle may provide a low power mode switching signal to the master SoC in the multi SoC module in response to the module mode being changed from the normal module mode to the low power module mode to switch the master SoC from the normal mode to the low power mode, and transmit the low power mode switching signal from the master SoC to the slave SoC in the multi SoC module through Ethernet, thereby switching the slave SoC from the normal mode to the low power mode.

In response to an application being activated in a vehicle in the driving state, the apparatus for managing power of a multi SoC module in a vehicle may store data on the application at an allocated address in at least one of the plurality of memories corresponding to a specific SoC associated with the application among the plurality of SoCs by using an MMU in the specific SoC. In response to the specific SoC being switched from the normal mode to the low power mode according to a set condition, the apparatus for managing power of a multi SoC module in a vehicle may reallocate data on at least one application stored in the plurality of memories to the address in the memory selected from the plurality of memories and store the data therein using the MMU, and activate the selected memory to supply power thereto and stop supplying power to the remaining memories other than the activated memory.

In this case, the apparatus for managing power of a multi SoC module in a vehicle may select, among the activated applications, the application associated with the function that was last used in the vehicle before the specific SOC was switched from the normal mode to the low power mode, and store the data on the selected application in the selected memory. In addition, the apparatus for managing power of a multi SoC module in a vehicle may further store data on a home screen associated with the function performed by the specific SoC in the selected memory.

In addition, in response to at least one of the plurality of SoCs being switched from the normal mode to the low power mode according to the set condition, the apparatus for managing power of a multi SoC module in a vehicle may activate the memory selected from the plurality of memories corresponding to the switched SoC and an interrupt DSP in the switched SoC to supply power thereto, and deactivate the remaining memories other than the activated memory and the components in the switched SoC other than the activated interrupt DSP so as to stop supplying power thereto.

Figure 18:
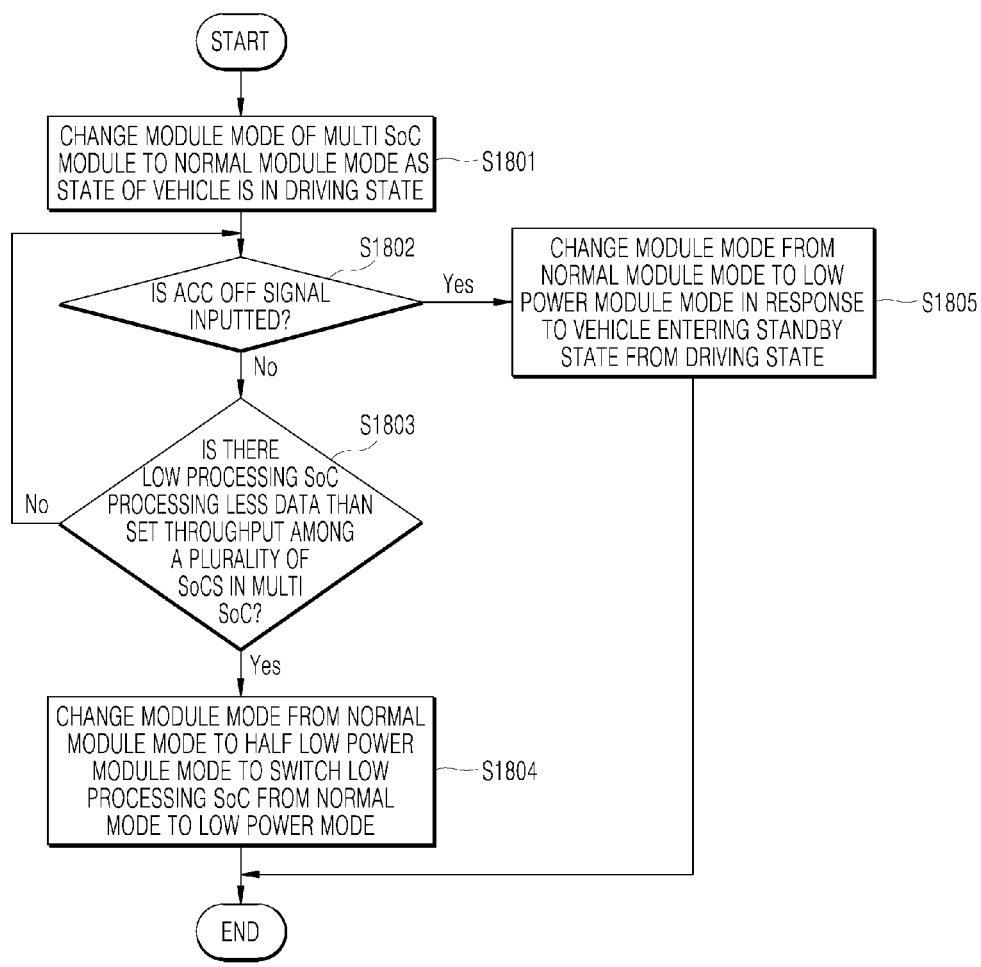
FIG. 18 is a flowchart showing another example of the method for managing power of a multi SoC module in a vehicle according to an embodiment of the present disclosure.

FIG. 18 is a flowchart showing another example of the method for managing power of a multi SoC module in a vehicle according to an embodiment of the present disclosure.

Referring to FIG. 18, in step S1801, the apparatus for managing power of a multi SoC module in a vehicle may receive the ACC ON signal, and change the state of the vehicle to the driving state as the vehicle starts up. In this case, the apparatus for managing power of a multi SoC module in a vehicle may switch the plurality of SoCs in the multi SoC module from the power on mode to the normal mode in response to the module mode of the multi SoC module being changed from the power on module mode to the normal module mode based on the state of the vehicle being changed to the driving state.

In step S1802, the apparatus for managing power of a multi SoC module in a vehicle may check whether an ACC OFF signal has been inputted, and upon a determination that the ACC OFF signal has not been inputted as a result of the checking, may determine whether there is a low processing SoC, which processes less data than a set throughput, among the plurality of SoCs in the multi SoC. In step S1802, while the apparatus for managing power of a multi SoC module in a vehicle may check whether the ACC OFF signal has been inputted, the present disclosure is not limited thereto, and the apparatus for managing power of a multi SoC module in a vehicle may continuously perform checking while the state of the vehicle is in the driving state.

In response to a determination in step S1803 that there is a low processing SoC, which processes less data than the set throughput, in step S1804 the apparatus for managing power of a multi SoC module in a vehicle may change the module mode from the normal module mode to the half low power module mode regardless of the capacity of the battery, thereby maintaining the remaining SoCs other than the low processing SoC in the normal mode while switching the low processing SoC from the normal mode to the low power mode.

Alternatively, in response to a determination in step S1803 that there is no low processing SoC, the process returns to step S1802, and the apparatus for managing power of a multi SoC module in a vehicle may check whether the ACC OFF signal has been inputted.

Meanwhile, in response to a determination that the ACC OFF signal has been inputted as a result of the checking in step S1802, the apparatus for managing power of a multi SoC module in a vehicle may cause the vehicle to enter the standby state from the driving state in step S1805. Here, the apparatus for managing power of a multi SoC module in a vehicle changes the module mode from the normal module mode to the low power module mode in response to the state of the vehicle entering the standby state from the driving state, thereby switching each of the plurality of SoCs from the normal mode to the low power mode. In this case, the apparatus for managing power of a multi SoC module in a vehicle supplies power from the backup battery in the vehicle to each of the plurality of SoCs that have been switched to the low power mode.

When checking for input of the ACC OFF signal, the apparatus for managing power of a multi SoC module in a vehicle may check whether the ACC OFF signal has been inputted by detecting the ACC OFF signal from CAN data. In addition, the apparatus for managing power of a multi SoC module in a vehicle may cause the vehicle to enter the standby state from the driving state based on a danger signal indicating that the capacity in the main battery is insufficient being detected from the CAN data in response to the capacity of the main battery in the vehicle being lower than a set standby switching reference value (lower than the first reference value).

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as those produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited by the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An apparatus for managing power of a multi system on chip (SoC) module in a vehicle, comprising:
   a multi SoC module configured to include a plurality of systems on chip (SoC); and
   a processor configured to:
   based on the vehicle being in a driving state, calculate a sum of throughputs of the plurality of SoCs as a total throughput,
   determine whether the total throughput is less than a data throughput,
   based on determining that the total throughput is less than the data throughput, select, from the plurality of SoCs, one or more SoCs that are capable of processing the total throughput,
   maintain the selected SoCs in a normal mode,
   switch one or more remaining SoCs of the plurality of SoCs, other than the selected SoCs, to a low power mode,
   store data on an application at an allocated address in at least one of a plurality of memories corresponding to a specific SoC associated with the application among the plurality of SoCs using a memory management unit (MMU) in the specific SoC, in response to the application being activated in the vehicle in the driving state, and
   in response to the specific SoC being switched from the normal mode to the low power mode according to a set condition, reallocate data on at least one application stored in the plurality of memories to an address in the memory selected from the plurality of memories and store the data at the address using the MMU, and activate the selected memory to supply power to the selected memory and stop supplying power to the remaining memories other than the activated memory.

2. The apparatus of claim 1, wherein the processor is configured to, based on the total throughput being more than the data throughput,
   change a module mode of the multi SoC module from a normal module mode to a half low power module mode based on a capacity of a main battery in the vehicle being lower than a first reference value during the driving state;
   maintain a first SoC associated with safety among the plurality of SoCs supplied with power from the main battery in the normal mode, and switch a remaining second SoC other than the first SoC to the low power mode;
   supply power from a backup battery in the vehicle, instead of the main battery, to the first SoC based on the capacity of the main battery being lower than a second reference value; and
   switch the second SoC from the low power mode to a power off mode,
   wherein the second reference value is lower than the first reference value.

3. The apparatus of claim 2, wherein the processor is configured to change the module mode from the half low power module mode to a power off module mode in response to a capacity of the backup battery being lower than the second reference value, to also switch the first SoC from the normal mode to the power off mode.

4. The apparatus of claim 2, wherein the processor is configured to:
switch the module mode from the normal module mode to a low power module mode in response to the vehicle entering a standby state from the driving state, to switch each of the plurality of SoCs from the normal mode to the low power mode; and
supply power from the backup battery in the vehicle to each of the plurality of SoCs that have been switched to the low power mode.

5. The apparatus of claim 4, wherein the processor is configured to cause the vehicle to enter the standby state from the driving state based on a microcomputer detecting an accessory (ACC) OFF signal among controller area network (CAN) data or detecting a danger signal indicating that the main battery is insufficient among the CAN data, in response to the capacity of the main battery being lower than a set standby switching reference value,
wherein the set standby switching reference value is lower than the first reference value.

6. The apparatus of claim 4, wherein the multi SoC module comprises a master SoC and a slave SoC,
wherein the processor is configured to:
provide a low power mode switching signal to the master SoC in response to the module mode being changed from the normal module mode to the low power module mode to switch the master SoC from the normal mode to the low power mode; and
transmit a low power mode switching signal from the master SoC to the slave SoC through Ethernet to switch the slave SoC from the normal mode to the low power mode.

7. The apparatus of claim 2, wherein the processor is configured to:
determine whether there is a low processing SoC processing less data than a set throughput, among the plurality of SoCs; and
in response to a determination that there is a low processing SoC, maintain remaining SoCs other than the low processing SoC in the normal mode while switching the low processing SoC from the normal mode to the low power mode, regardless of the capacity of the main battery.

8. The apparatus of claim 1, wherein the processor is configured to select, among the activated applications, an application associated with a function that was last used in the vehicle before the specific SOC was switched from the normal mode to the low power mode, and store data on the selected application in the selected memory.

9. The apparatus of claim 1, wherein the processor is further configured to store data on a home screen associated with a function performed in the specific SoC in the selected memory.

10. The apparatus of claim 1, wherein the processor is configured to:
in response to at least one of the plurality of SoCs being switched from the normal mode to the low power mode according to a set condition, activate a memory selected from a plurality of memories corresponding to the switched SoC and an interrupt digital signal processor (DSP) in the switched SoC so as to supply power to the activated memory and interrupt DSP; and
deactivate the remaining memories other than the activated memory and components in the switched SoC other than the activated interrupt DSP so as to stop supplying power to the remaining memories other than the activated memory and the components in the switched SoC other than the activated interrupt DSP.

11. A method for managing power of a multi system on chip (SoC) module in a vehicle, comprising:
based on the vehicle being in a driving state, calculating a sum of throughputs of a plurality of SoCs as a total throughput;
determining whether the total throughput is less than a data throughput;
based on determining that the total throughput being less than the data throughput, selecting, from the plurality of SoCs, one or more SoCs that are capable of processing the total throughput;
maintaining the selected SoCs in a normal mode;
switching one or more remaining SoCs of the plurality of SoCs, other than the selected SoCs, to a low power mode;
storing data on an application at an allocated address in at least one of a plurality of memories corresponding to a specific SoC associated with the application among the plurality of SoCs using an MMU in the specific SoC associated with the application, in response to the application being activated in the vehicle in the driving state;
in response to the specific SoC being switched from the normal mode to the low power mode according to a set condition, reallocating data on at least one application stored in the plurality of memories to an address in the memory selected from the plurality of memories and storing the data at the address using the MMU; and
activating the selected memory to supply power to the selected memory, and stopping supplying power to the remaining memories other than the activated memory.

12. The method of claim 11, further comprising:
based on the total throughput being more than the data throughput,
changing a module mode of the multi SoC module from a normal module mode to a half low power module mode based on a capacity of a main battery in the vehicle being lower than a first reference value during the driving state;
maintaining a first SoC associated with safety among the plurality of SoCs in the multi SoC module supplied with power from the main battery in the normal mode, and switching a remaining second SoC other than the first SoC to the low power mode;
after the switching of the second SoC to the low power mode,
supplying power from a backup battery in the vehicle instead of the main battery to the first SoC in response to the capacity of the main battery being lower than a set second reference value; and
switching the second SoC from the low power mode to a power off mode,
wherein the set second reference value is lower than the first reference value.

13. The method of claim 12, further comprising:
after the switching of the second SoC from the low power mode to the power off mode, changing the module mode from the half low power module mode to a power off module mode in response to a capacity of the backup battery being lower than the set second reference value, to also switch the first SoC from the normal mode to the power off mode.

14. The method of claim 12, further comprising:
switching the module mode from the normal module mode to a low power module mode in response to the vehicle entering a standby state from the driving state, to switch each of the plurality of SoCs from the normal mode to the low power mode; and
supplying power from a backup battery in the vehicle to each of the plurality of SoCs that have been switched to the low power mode.

15. The method of claim 14, further comprising:
prior to switching each of the plurality of SoCs from the normal mode to the low power mode,
causing the vehicle to enter the standby state from the driving state based on a microcomputer detecting an accessory (ACC) OFF signal or detecting a danger signal indicating that the capacity of the main battery is insufficient among controller area network (CAN) data, in response to the capacity of the main battery being lower than a set standby switching reference value,
wherein the set standby switching reference value is lower than the first reference value.

16. The method of claim 14,
wherein the multi SoC module comprises a master SoC and a slave SoC, and
wherein the switching of each of the plurality of SoCs from the normal mode to the low power mode comprises:
providing a low power mode switching signal to the master SoC in response to the module mode being changed from the normal module mode to the low power module mode to switch the master SoC from the normal mode to the low power mode; and
transmitting a low power mode switching signal from the master SoC to the slave SoC through Ethernet to switch the slave SoC from the normal mode to the low power mode.

17. The method of claim 11, wherein the reallocating and storing the data comprises selecting, among the activated applications, an application associated with a function that was last used in the vehicle before the specific SOC was switched from the normal mode to the low power mode, and storing the data on the selected application in the selected memory.

18. The method of claim 11, further comprising:
in response to at least one of the plurality of SoCs being switched from the normal mode to the low power mode according to a set condition, activating a memory selected from a plurality of memories corresponding to the switched SoC and an interrupt digital signal processor (DSP) in the switched SoC so as to supply power to the activated memory and interrupt DSP; and
deactivating the remaining memories other than the activated memory and components in the switched SoC other than the activated interrupt DSP so as to stop supplying power to the remaining memories other than the activated memory and the components in the switched SoC other than the activated interrupt DSP.

\* \* \* \* \*